INVENTOR
Paul R. Hoffman
BY Hofgren, Wegner,
Allen, Stellman & McCord
Attys.

Feb. 28, 1967 P. R. HOFFMAN 3,306,415

TAPE CONTROLLED MATRIX PRINTING SYSTEM FOR RECORDING BOWLING SCORES

Filed May 11, 1965 14 Sheets-Sheet 2

United States Patent Office 3,306,415

Patented Feb. 28, 1967

3,306,415

TAPE CONTROLLED MATRIX PRINTING SYSTEM FOR RECORDING BOWLING SCORES

Paul R. Hoffman, Grand Haven, Mich., assignor to Brunswick Corporation, a corporation of Delaware

Filed May 11, 1965, Ser. No. 454,865
29 Claims. (Cl. 197—2)

The present invention relates to apparatus useful in the printing of bowling scores. Further, this invention relates to a printing system capable of printing score information required for scoring a bowling game on a bowling score sheet.

Recently, a bowling score device has been developed which automatically calculates bowling score information needed for printing a complete score sheet during a bowling game. Such calculated score information includes the special marks associated with the bowling game such as strikes, spares, fouls, ball scores, and team mark totals. For the purpose of official league bowling contests, it is particularly desirable that a complete and relatively permanent bowling score sheet be produced as a record of the game and be in a form giving information regarding the progression of the game with score information entered as would normally be done manually during a game. Thus, it is desirable in an automatic scoring system to provide a system for printing all the scoring information necessary for a complete bowling score sheet.

In accordance with one embodiment of the present invention, there is provided a new and useful printing system which may be used for printing bowling game scores for a plurality of bowlers on a plurality of lanes during a plurality of generally concurrent games and which is further capable of giving printed readout of all information normally included in a bowling score sheet during ball-by-ball bowling.

It is a general object of this invention to provide new and useful apparatus of the type described.

It is also the object of this invention to provide new apparatus which is useful in the automatic scoring of bowling games for printing of complete score information for each bowler including individual and team scores.

Another object is to provide means actuatable by a bowler for informing the printing system which bowler is bowling and on which lane he is bowling.

A more specific object is to provide a new and useful mechanical printer for printing score data at selected positions along X and Y axes.

It is also an object to provide new and useful printing means in which a printing head is indexed to printing position and actuated by means not carried by the head.

It is a further object of this invention to provide a new and useful binary drive including separate drives for positioning a printing head simultaneously on X and Y axes.

Another object is to provide a new and useful bowling score printing system in which box scores for all balls in a frame can be printed from a common print head printing position.

A still further object of this invention is to provide new and useful means for readout of computed bowling score information.

Still another object is to provide new and useful drive means for a printer for positioning the printing type over a surface and actuating the type to print on the surface.

Other objects will be apparent from the following description and the drawings in which.

Figure 1:
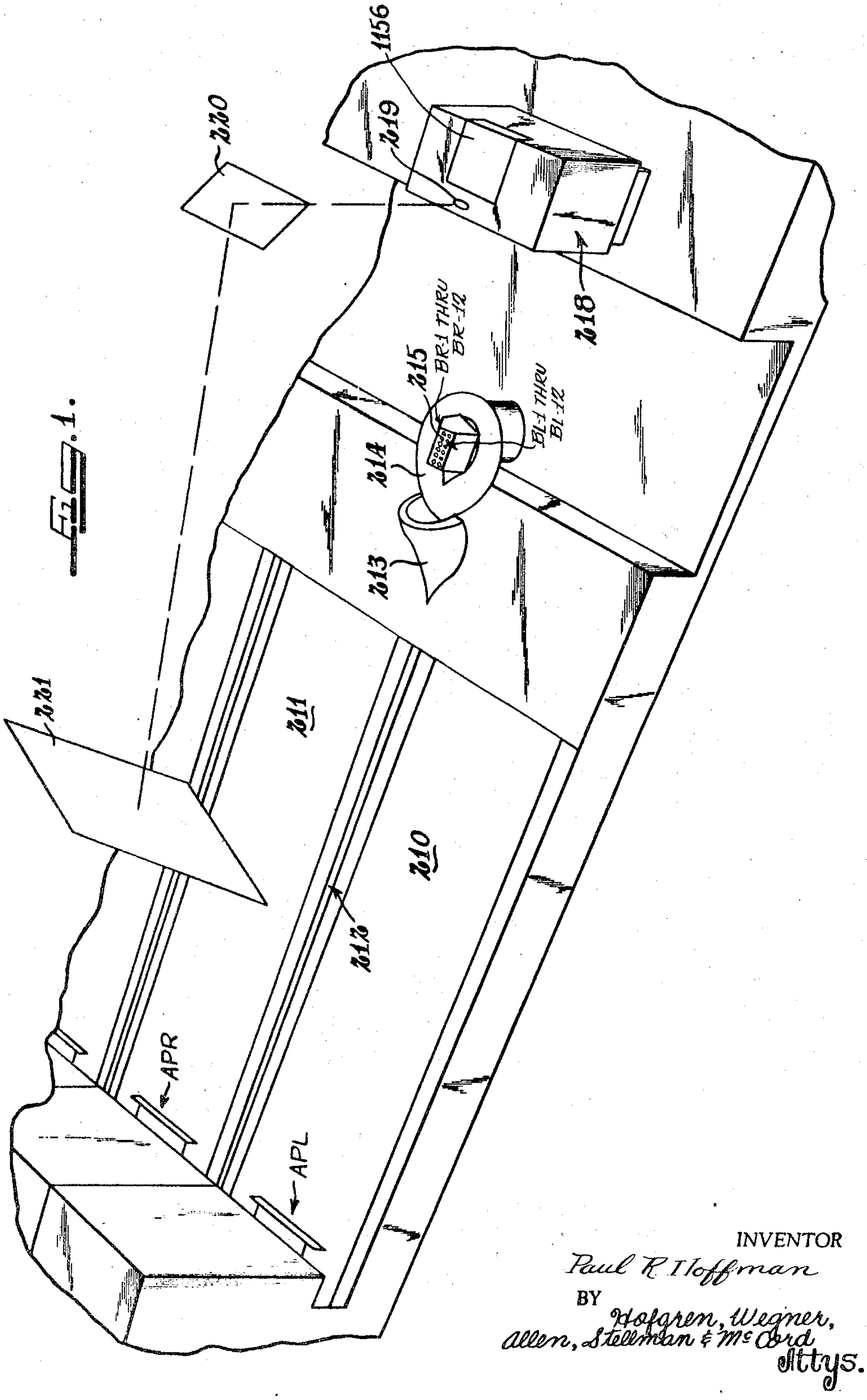
FIG. 1 is a view of a plurality of bowling lanes with a housing containing a printing system of this invention mounted at the bowlers' end of the lane.

While an illustrative embodiment of the invention is shown in the drawings and will be described in detail herein, the invention is susceptible of embodiment in many different forms and it should be understood that the present disclosure is to be considered as an exemplification of the principles of the invention and is not intended to limit the invention to the embodiment illustrated.

A form of printing system of this invention is mounted in a housing 218 located at the bowlers' end of a pair of bowling lanes 210 and 211 with a divider 212 therebetween. Each of bowling lanes 210 and 211 includes, in the installation, an automatic pinsetter, indicated generally at APL and APR at the pinsetting end of the lane. Balls are bowled in the usual manner and returned through a conventional ball return system having a ball outlet 213 for delivery of balls to a ball storage rack 214 from which the balls may be removed for bowling. A bowler's identification console 215 is provided for use by bowlers bowling on lanes 210 and 211 for manual information input for use by the printer and a scoring device which may be enclosed and supported in housing 218. The scoring device includes components for computation of bowling scores from pinfall information input, e.g. from automatic pinsetters APL and APR, such as described in copending application Serial No. 366,297 of Cornell et al. filed May 11, 1964, and entitled "Automatic Bowling Scorer." All score information normally manually recorded during a bowling game is printed on a score sheet during the game by the printer, and an image of the score sheet may be projected by projection means in housing 218 through port 219 and reflected by mirror 220 to viewing screen 221.

Figure 2:
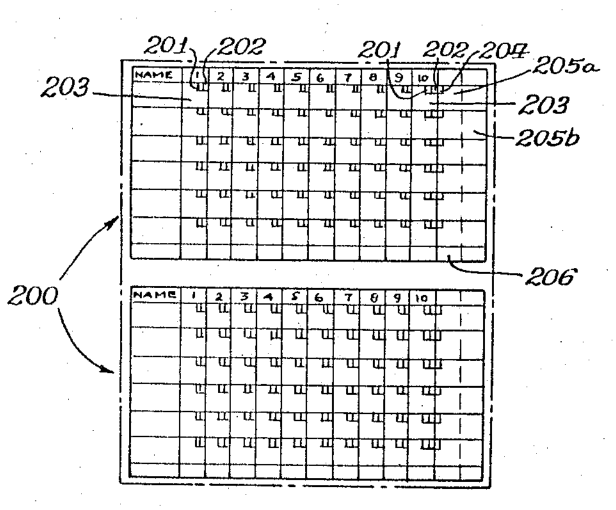
FIG. 2 illustrates a score sheet suitable for use with the printing system.

Referring to FIG. 2, there is illustrated a score sheet 200 which may be used by the printer system for printing score information thereon. The printing areas are identified as the first ball score boxes 201, the second ball score boxes 202, the tenth frame third ball score box 204, the frame score area 203, the team total score area 205*a* and 205*b* and the marks area 206. Area 205*a* accommodates the numeral "1" when team total is over 999. Player game total is printed in area 203 of the 10th frame for each player. Entry of score information in the various boxes and areas is in accordance with normal scoring procedure, such as described in the above identified application of Cornell et al.

Console 215 is accessible to bowlers for manual operation of various switch means as information inputs for the printing system which is housed in structure 218. The console is for use, in the illustrated embodiment, by bowlers on two bowling lanes 210 and 211 and accordingly has two similar control surfaces or panels for use by bowlers bowling on lanes 210 and 211 respectively. Each of the panels includes a set of twelve bowler identification switch buttons indicated as BL–1 through BL–12 for the lane 210 panel, and BR–1 through BR–12 for the lane 211 panel (wiring diagram, FIG. 26). A latch mechanism may be used to latch all other BL or BR buttons against depression upon depressing one such button; the latch mechanism also latches the depressed button in depressed position. A solenoid can be provided for driving the latch mechanism. For example, a solenoid may be used for each set of buttons for actuating a button latch mechanism, for latching the present buttons BR and BL in both open and closed positions.

The bowler identity buttons are provided for the purpose of feeding information into the system with respect to the identity of the bowler and the identity of the lane on which the bowler is bowling and also the identity of the bowler's team where team bowling conditions prevail.

Under league bowling conditions each member of a team uses a separate button under the heading of his team, i.e., team A or team B; however, the team members select or are assigned only from the first five buttons, i.e., omitting buttons BL–6 and BR–6 and BL–12 and BR–12. The last player to bowl on each team is assigned the fifth button, i.e., BL–5 and BR–5 or BL–11 and BR–11. In the illustrated system, the sixth button is for use by a pace bowler or other nonteam player. Once the team player has been assigned his button, he may bowl on either alley at any time, as far as the illustrated system is concerned, by simply depressing his button prior to starting each frame on the appropriate lane. For example, if a member of team A is designated to use button No. 3, when bowling on lane 210 he depresses button BL–3 prior to starting each frame and on lane 211 he depresses button BR–3 prior to each frame. Accordingly, a member of the other team, e.g., the member assigned button No. 4 of team B, depresses button BL–10 on the left lane prior to starting each frame on that lane and depresses button BR–10 prior to starting each frame on the right lane.

Suitable computation and control means housed in housing 30 may include one mechanical computation unit having a mechanical computer for servicing a plurality of bowlers bowling on a plurality of bowling lanes. The computation unit is fed pinfall information from both of pinsetters APL or APR. The computation or control system is also fed information from the bowler console 215 with respect to bowler identity, team identity, particular identity of the last man on the team or a pace bowler depending upon the button used; and the bowler panels serve to alert the computation and control system. The computation and control system serves to control each automatic pinsetter to which it is linked, and the computation and control system further serves to actuate the printing means for printing of computed scores or score information as described by Cornell et al., identified above.

Figure 26:
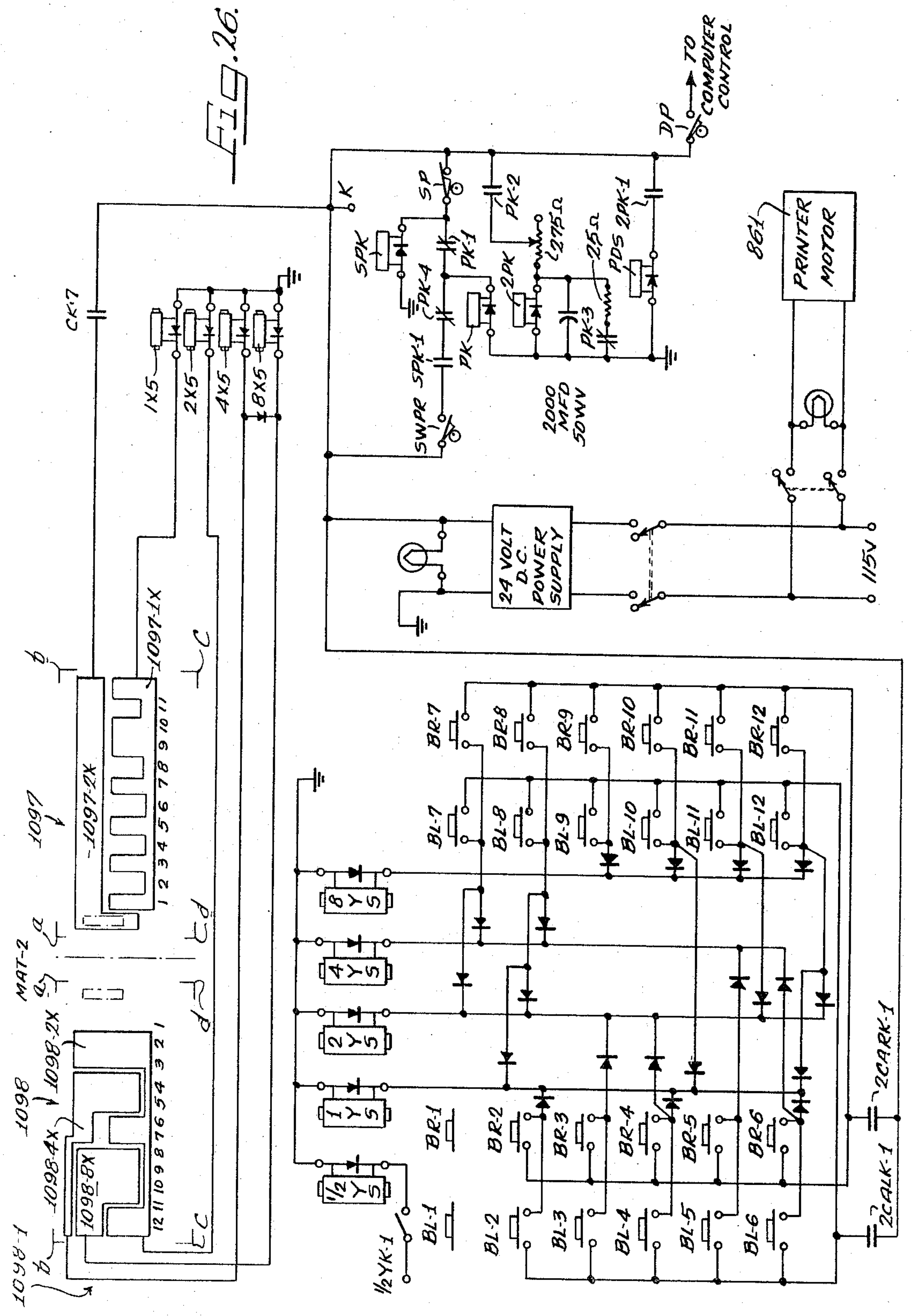
FIGS. 26 and 27 are schematic diagrams including wiring or circuitry for control of the printing system.
Figure 27:
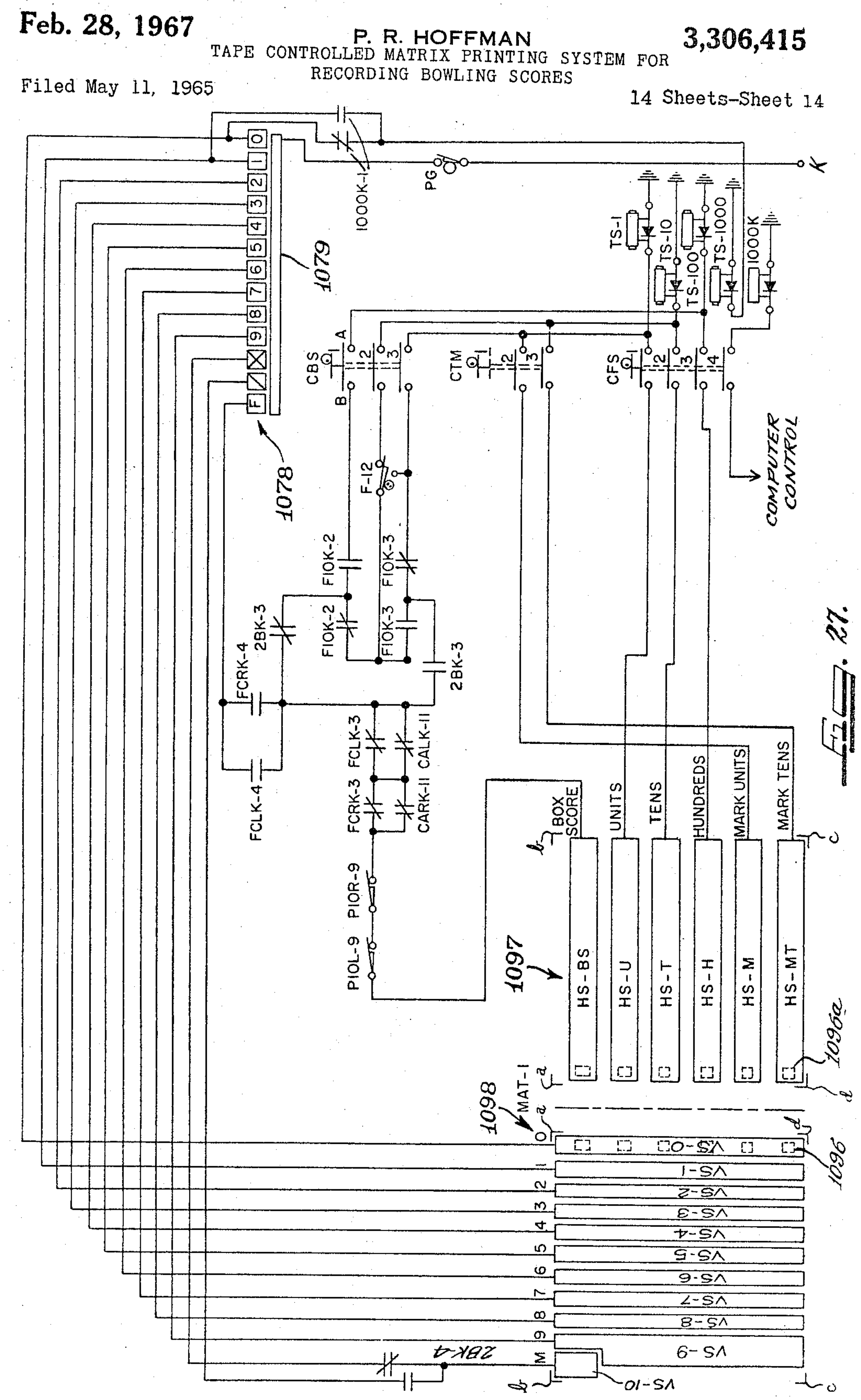

During description of the present printing system, certain functions of the computer will be described for control of the printer. Although more precise descriptions may be had by reference to the above mentioned Cornell et al. application, some of the control is by switches SWPR, CBS, CFS and CTM (FIGS. 26 and 27). Switch SWPR is provided for sending a "print" signal from the computer to the printer for purposes of printing the score reflected by disposition of contacts 1096 with respect to strips VS and HS of matrix MAT–1, and can be considered as a composite of switches PTM, PFS and PBS described by Cornell et al., and can be closed by the Cornell et al. computation and control system in the same manner as the Cornell et al. switches PTM, PFS and PBS. Switches CBS, CFS and CTM are normally open switches, spring-urged toward open position. Switches CBS, CFS and CTM are of a type wherein each is closed, e.g. by the Cornell et al. computer, for connecting appropriate score information channels to the printer; and, upon closure, each latch is closed and is released by the computer after the information has been printed. Switches CBS, CFS or CTM, respectively, connect box score, frame score or team marks information channels from the computer to the printer. Other switches will be described with the description of the printer.

The printing mechanism (FIG. 3) is mounted on a frame 830 in casing 218 (FIG. 1) and includes a carriage 831 movable in X and Y directions and carrying a print head 832, a driven differential gear mechanism 834 for moving the carriage a predetermined number of units in each direction and a printer head operating mechanism generally indicated at 835 for setting type in head 832 responsive to readout signals from the computation unit.

Figure 4:
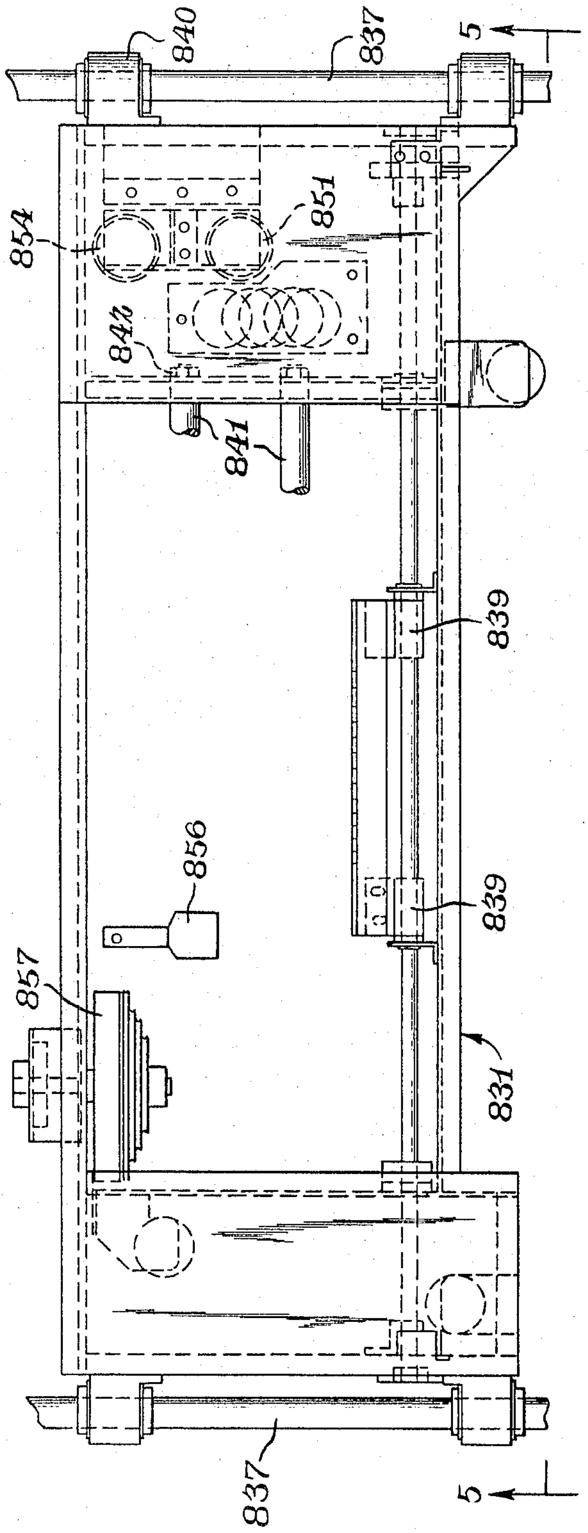
FIG. 4 is an enlarged plan view of a carriage in FIG. 3 with parts removed therefrom.
Figure 5:
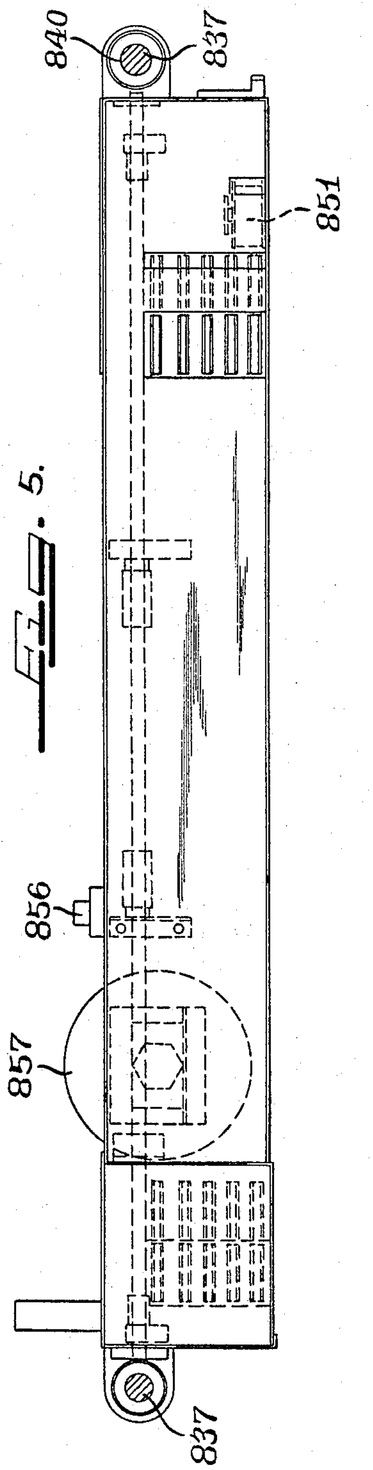
FIG. 5 is a section and view along line 5—5 of FIG. 4.

Frame 830 may be supported on suitable legs or the like and in the illustrated form, is mounted within cabinet or housing (FIG. 1). Mounted on frame 830 by brackets 836 are a pair of parallel bars 837. A carriage member 831, having sleeves 840 secured thereto, is slidably mounted on bars 837, slidable along an X axis as viewed in FIG. 3. Considering FIGS. 3–5, a second pair of parallel bars 841 is mounted on carriage member 831 at each end of each bar as indicated at 842. A printing head 832 is slidably mounted by sleeves 844 on bars 841, slidable along a Y axis.

Figure 3:
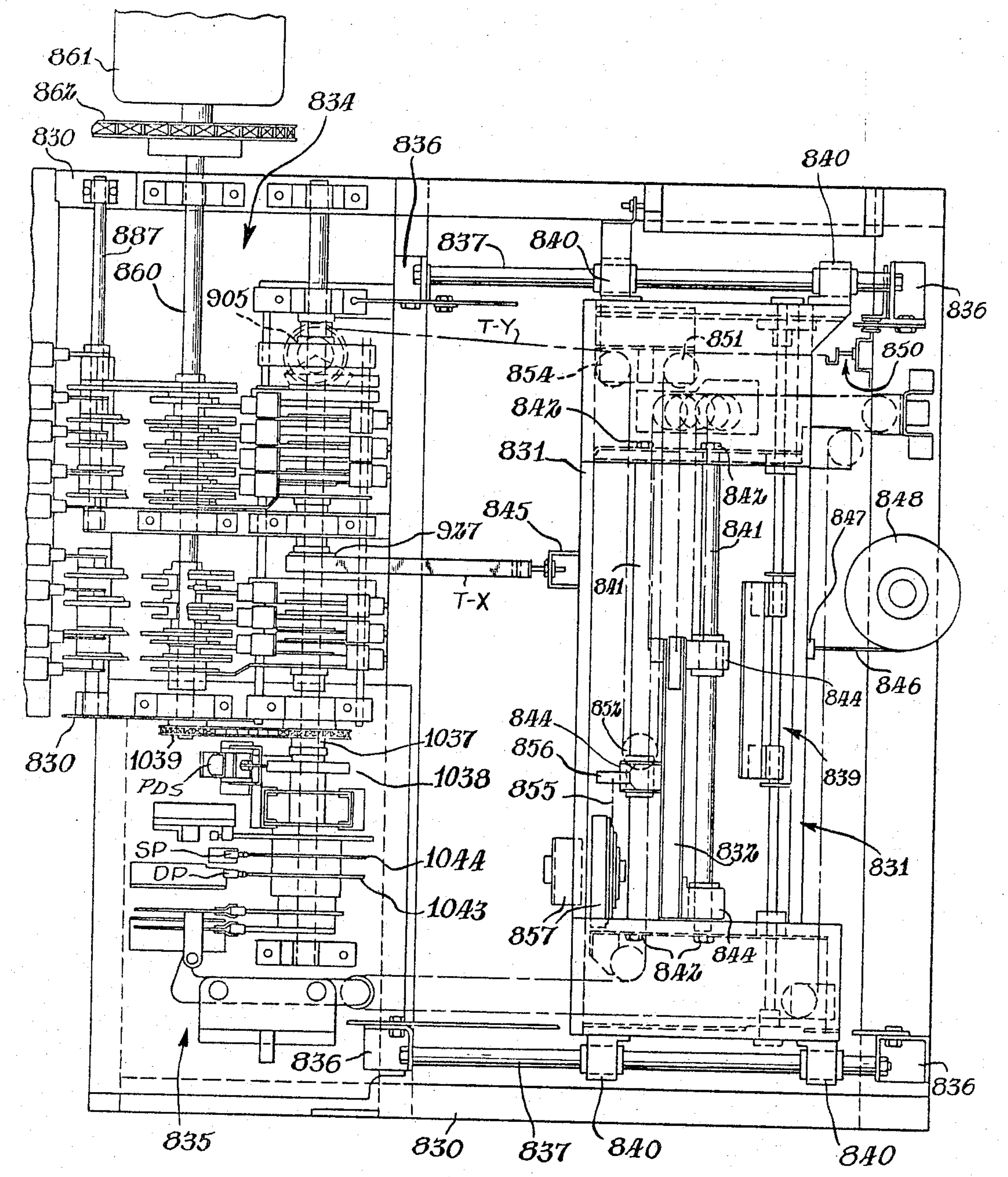
FIG. 3 is a plan view of a printing system contained within the housing in FIG. 1.

A carriage positioning tape T–X is secured at one end by bracket 845 to carriage 831 for pulling carriage 831 to the left as viewed in FIG. 3 with sleeves 840 sliding on bars 837. A cable 846 is secured to the opposite side of carriage 831 by bracket 847. Cable 846 is extensible from and retractable by a spring rewind reel 848 having sufficient spring power to move carriage 831 the extent of its travel to the right in FIG. 3 to approximately the position shown, i.e. carriage home position, upon release of pull on tape T–X.

A print head positioning tape T–Y is secured at one end to frame 830 by bracket 850 and passes thence in order through pulley 851 rotatably mounted on carriage 831, pulley 852 rotatably mounted on print head 832, and pulley 854 rotatably mounted on carriage 831. The other ends of both tapes T–X and T–Y pass to windup spools driven by differential mechanism 834, as will be more fully described below. Another cable 855 is secured to print head 832 by bracket 856. Cable 855 is extensible from and retractable by a spring rewind reel 857 having sufficient power to move print head 832 along the Y axis to its limit of movement in one direction, i.e. to a home position in which the carriage is illustrated in FIG. 3 upon release of pull on tape T–X.

The printer head 832 is normally maintained in home position and is moved from home position for positioning the head correctly for each desired printing operation via tapes T–X and T–Y. Upon release of tapes T–X and T–Y, the head again returns to home position, the distance permitted by playout of tapes T–X and T–Y. However, in order to take tension off tapes T–X and T–Y while the head is in home position, abutments (not shown) are provided against which each carriage 831 and print head 832 rest while in home positions.

Each of the tapes T–X and T–Y for positioning the printer head is windable at its other end in one direction by a spool 905 or 927 and is extended from the spool 905 or 927 by spring means 857 and 848 urging the printing head in the opposite direction. The amount of winding of the tape on the spool determines the position of the printing head along the X and Y coordinates. The spools are each driven by a separate differential system, as a part of mechanism 834, each differential system being capable of moving a shaft for driving one of the tape spools a predetermined amount from a home position, the home position corresponding to the position of the printer head with both tapes fully extended from the spools.

Figure 8:
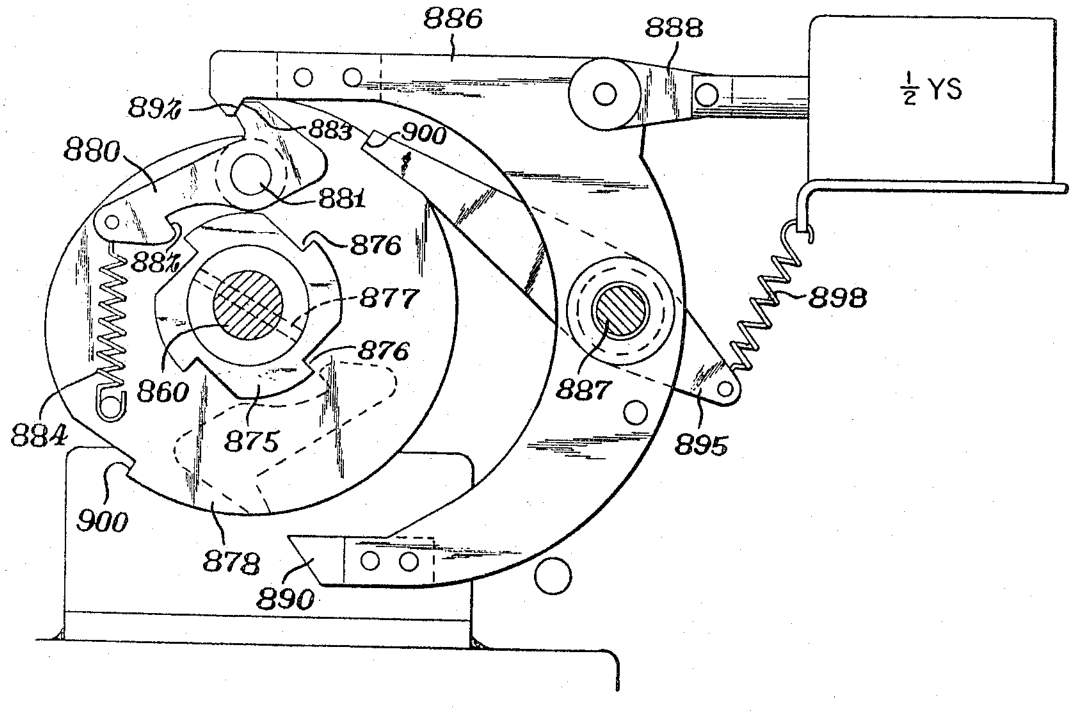
FIG. 8 is a section along line 8—8 of FIG. 6.

More particularly, a shaft 860 rotatably mounted on frame 830 is driven by a motor 861 through a sprocket drive 862. Shaft 860 has a plurality of one-half revolution clutches 864 through 872 (FIGS. 6 and 8) mounted thereon.

Each clutch (FIG. 8) has a drive ratchet wheel 875 including notches 876 at 90° intervals and mounted on shaft 860 by means of pin 877. Also, in each clutch is a wheel 878 rotatably mounted on shaft 860 for rotation relative thereto and carrying a latch member 880 pivotally mounted at 881 on disc 878 and having latching surfaces 882 and 883. Surface 882 is adapted to engage notch 876 and is normally urged toward engagement with notch 876 by means of spring 884 having one end secured to latch member 880 and the other end of disc 878.

Shaft 887 is mounted between portions of frame 830. A pawl 886 is pivotally mounted on shaft 887 for pivoting from a latched position shown in FIG. 8 in a clockwise direction to an unlatched half-revolution hold position, as will be described hereinbelow. Pawl 886 is secured to an armature of a solenoid 1/2YS, 1YS, 2YS, 4YS, 8YS, 1XS, 2XS, 4XS, or 8XS by means of link 888 pivotally connected at one end to pawl 886 and at the other end to the armature. Actuation of the solenoid pulls the armature into the solenoid pivoting pawl 886 in a clockwise direction about shaft 887, whereby pawl 886 releases surface 883 of latch 880 and latch 880 is urged by spring 884 so that surface 882 is swung into the path of the rotating ratchet wheel 875 rotating on shaft 860. Notch 867 engages surface 882, and pawl carrier 878 is thereby latched to ratchet wheel 875 for rotation therewith. Pawl carrier 878 rotates one-half revolution, whereupon end 890 of pawl 886, which has been pivoted, engages surface 883 of latch 880 and causes latch 880 to pivot clockwise to the position shown in dotted lines to release ratchet wheel 875. Pawl carrier 878 is thereby stopped while ratchet wheel 875 continues to rotate as long as the solenoid remains energized. Upon de-energization of the solenoid, pawl 886 is pivoted back to the position shown in FIG. 8, releasing latch 880 which pivots counterclockwise to engage notch 876, whereby pawl carrier 878 again rotates with ratchet wheel 875 to complete the one revolution, i.e. until surface 892 of pawl 886 engages surface 883 of latch 880 and causes pawl carrier 878 to pivot latch 880 out of engagement with notch 876 and to stop pawl carrier 878 again in the position shown in FIG. 8.

Also pivotally mounted at 887 is a backstop latch member 895 which is normally urged in a counterclockwise direction by spring 898. A pair of receivers 900 is configurated to receive the end of latch member 895 each time rotation of pawl carrier 878 is stopped, i.e. at the one-half revolution hold position and at the normal position before or after completion of the one revolution. Thus, whenever pawl carrier 878 is in a stopped position, the end of latch member 895 abuts the surface of a receiver 900 in pawl carrier 878 to prevent reverse rotation which may be caused from impact.

Secured to each of pawl carriers 878 is an eccentric circular cam 901 (FIGS. 6 and 9) which rotates about shaft 860 one revolution with pawl carrier 878, so that a cam follower arm 902, having cam follower roller 904 riding on the surface of cam 901, travels from a low portion of the cam surface over a single rise and back to the low portion during each revolution. When pawl carrier 878 is in unlatched, one-half cycle stop position as stopped by pawl end 890, roller 904 is resting on the rise of cam 901. Thus, during the revolution of cam 901, the follower 902, which pivots about the axis of shaft 926, is pivoted in a counterclockwise direction in the instances of the cam folowers 902 of half-revolution clutches 864, 866, 868, 869 and 871; and at the half-revolution point, the cam follower is on the rise of the cam. In the instances of the other half-revolution clutches, i.e. 865, 867, 870 and 872, the cams 901 are of the same configuration but are disposed 180° with respect to the cams 901 of half-revolution clutches 864, 866, 868, 869 and 870; and the cam follower 902 is pivoted clockwise while on the rise of cam 901.

Each cam follower arm 902 is provided with an adjustable stop 906 which rests against frame member 907 when roller 904 is at its lowest travel. The stops 906 are provided for adjustment with 908 for adjusting to provide a gap 910 between roller 904 and cam 901 while roller 904 is on the low portion of cam 901. Thus, the position of planet gears 911 and the amount of movement of planet gears 911 during each revolution of the clutch mechanism is adjustable by means of adjustment 908.

A plurality of gear differentials 914 through 920 is provided, each differential gear including a sun gear 921, a pair of planet gears 911 and a ring gear 923. Two differential units are provided, first including gears 914 through 917 and the second including gears 918 through 920. The first differential is used in adjusting the Y direction tape T–Y for movement of carriage 831 in the Y direction, i.e. from printing position to printing position along a particular bowler's line, as directed by selection of the BL or BR switch identifying that bowler. The second differential unit is for adjustment of tape T–X to move carriage 831 along the X coordinate from bowler's line to bowler's line, and for moving between box score and frame score printing lines as directed by positioning of contacts in matrix MAT–2 of FIG. 26 and as described by Cornell et al., identified above.

Figure 6:
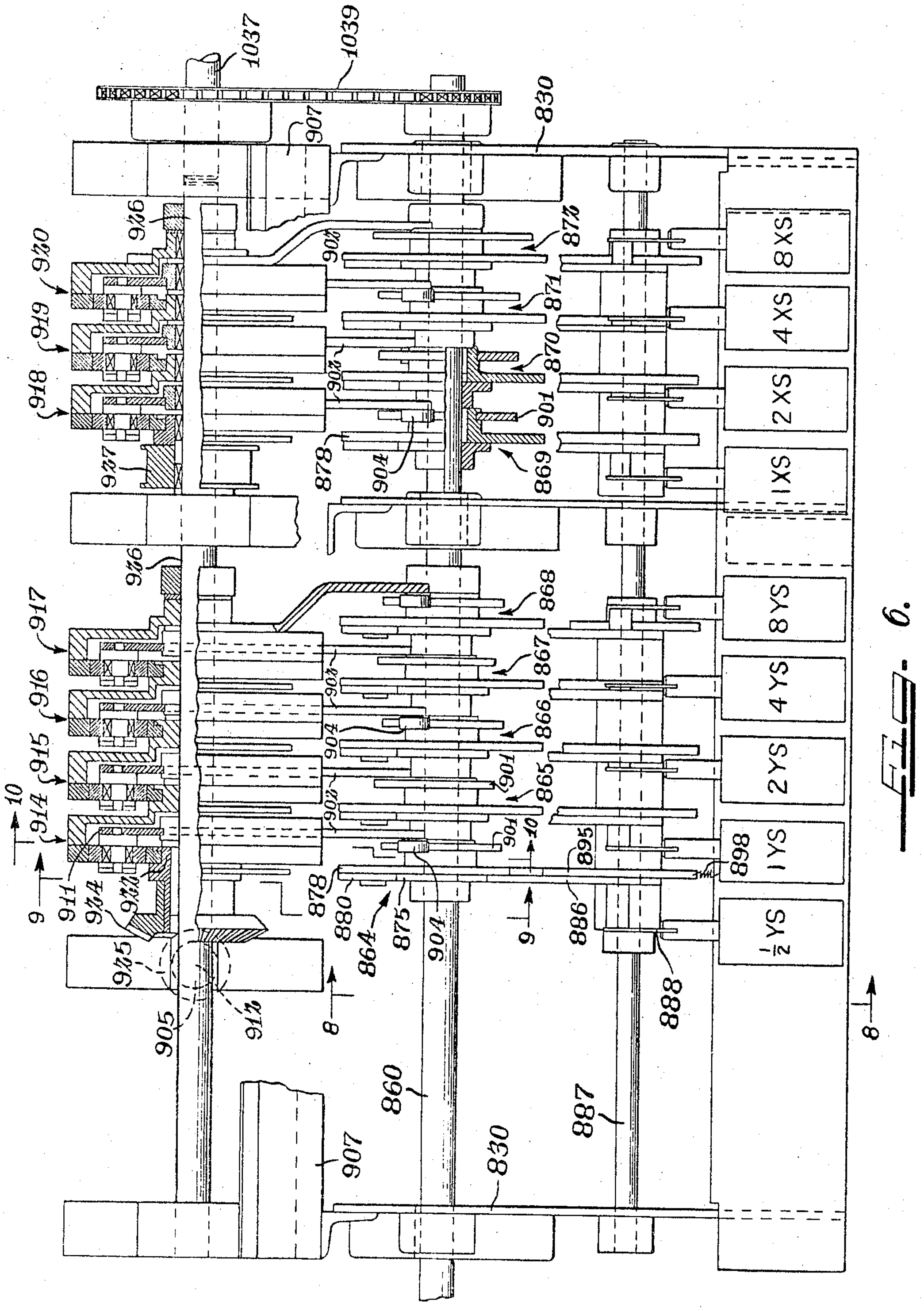
FIG. 6 is an enlargement of a carriage positioning means of the plan view of FIG. 3.
Figures 9, 10:
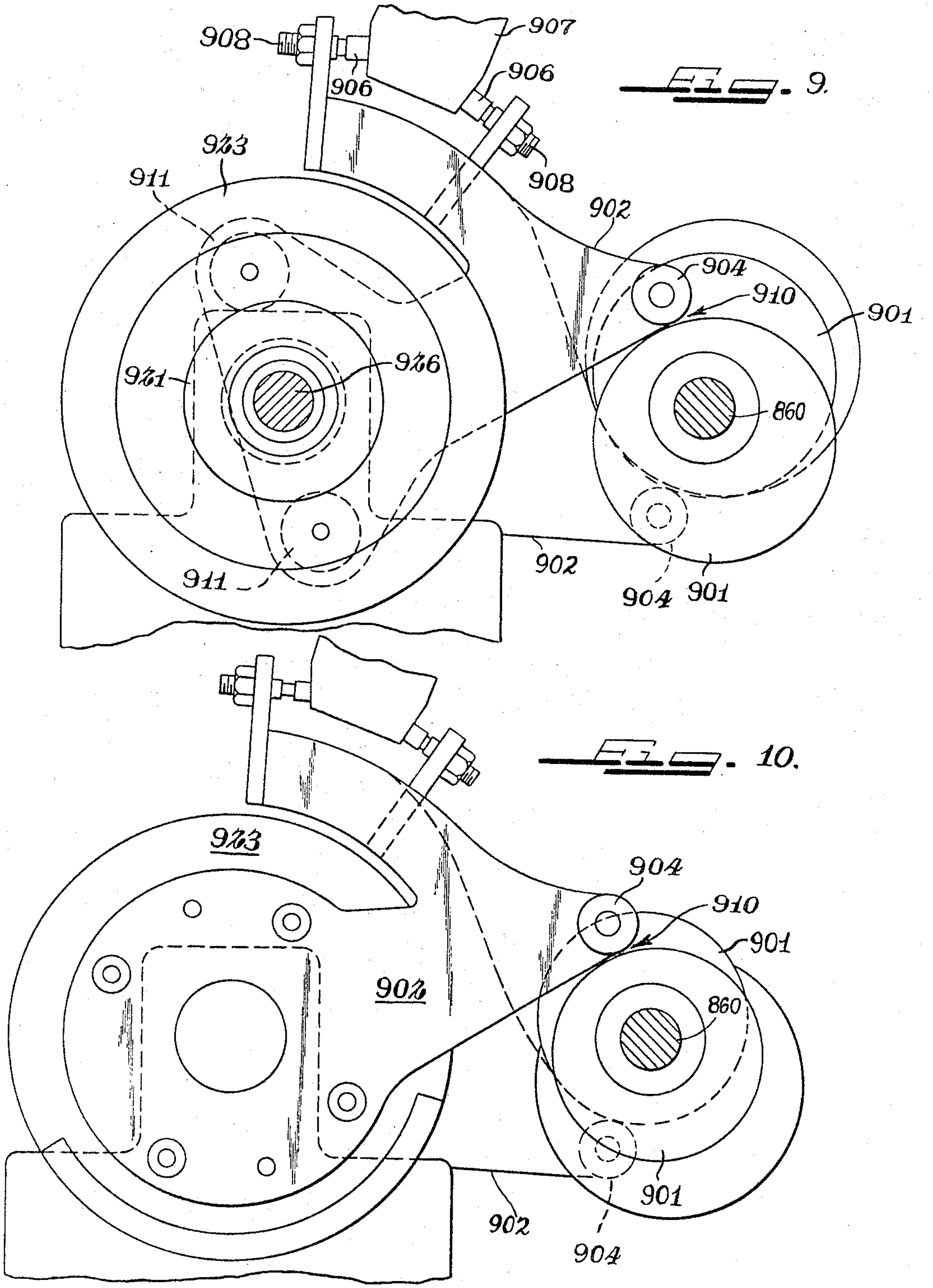
FIG. 9 is a section along line 9—9 of FIG. 6.
FIG. 10 is a view of a portion of a differential along line 10—10 of FIG. 6.

In the Y differential unit, the output shaft from the differential unit is shaft 922 which turns spool 905 through gears 924 and 925, spool 905 being pivotally mounted at 912 to frame 998. Each of gears 914 through 917 has its ring gear connected to the sun gear of the gear unit of next higher number with the exception of gear unit 917 where the ring gear is secured to the follower arm 902 of one revolution clutch and the cam assembly 868, as best shown in FIGS. 6, 9 and 10. The planet gears 911 of units 914 through 917 are mounted on follower arms 901 of clutch and cam units 864 through 867, inclusive.

Movement of planet gears 911 about shaft 926 in each gear unit causes output rotation of shaft 922 and corresponding rotation of spool 905 to wind a portion of tape T–Y thereon. The gear assemblies 914 through 917 are coordinated with each other in such manner that, for each pivoting of the respective cam follower 902 by cam 901 of clutch and cam assemblies 864 through 868, respectively, shaft 922 is rotated one-half unit, one unit, two units, four units and eight units, respectively, with the corresponding amount of tape being wound onto spool 905 and remaining wound on spool 905 as long as the corresponding Y solenoid, 1/2YS, 2YS, 4YS or 8YS remains energized. Each unit of measure corresponds to the distance from one bowler's line to the next on the score sheet upon which the printing is to be conducted.

The second differential unit including gear assemblies 918 through 920 operates on the same principle, with the exception that one of the intermediate units is eliminated. The gear assemblies are coordinated so that movement of follower arms 902 by means of clutch and cam assemblies 869 through 872, respectively (as actuated by X solenoids 1XS, 2XS, 4XS and 8XS), cause winding of 1, 2, 4 and 8 units of tape on spool 927 by the output from the sun gear of gear assembly 918. The operation of gear assembly 920 responsive to clutch and cam assemblies 871 and 872 is the same as the operation of gear assembly 917 responsive to clutch and cam assemblies 867 and 868, while the operation of gear assemblies 918 and 919 responsive to clutch and cam assemblies 869 and 870 is the same as the operation of gear assemblies 914 and 915 responsive to clutch and cam assemblies 864 and 865.

It will be apparent from the above that the array of solenoids 1/2YS through 8XS may be selectively actuated in order to position the print carriage for printing in any scorekeeping print position on the score sheet.

The Y solenoids are selected by the bowler identity switches BL and BR, and suitable circuitry (FIG. 26) links these switches for energizing the Y solenoids singly or in combinations to correctly position the printing head on the Y axis to the selected bowler's score line. The X solenoids are selected by the contacts controlled by the computation system for completing circuits through matrix MAT–2 corresponding to the proper frame of the game, and suitable circuitry is provided for energizing the X solenoids singly or in combination to correctly position the printing head on the X axis to the proper frame position for printing of the score. The BL and BR switches are illustrated with only one contact each for simplicity; however, these switches are preferably as described by Cornell et al. as including additional contacts for performing other functions in directing a computer to enter score correctly in a score memory system.

Print head 832, referring to FIGS. 11 through 18, includes a lower typesetting portion with the type disposed over a prism surface 928, an upper hammer actuating portion and an intermediate hammer 930 which is actuated by the hammer actuating portion to strike a row of type aligned by the typesetting portion to effect the printing operation upon a printable surface, such as score sheet 200, backed by surface 928.

In the typesetting portion, there are provided four parallel slides 931, each mounted on a pair of pins 932 through slots 934 and 935, pins 932 being secured at the ends to frame 936. The slides 931 are normally urged to the left, as viewed in FIGS. 11 and 12, by tension springs 937 grounded to frame 936 by suitable bracket means shown at 938 and attached at their other ends to upstanding flange portions 940, of slides 931. Each slide 931 is retained against sliding to the left by a separate tape 941 secured to flange 940, which tape is under tension from a typesetting control system to be described hereinbelow. In general, the typesetting control system plays out the tapes 941, permitting each of slides 931 to slide to the left a given number of units up to a maximum number of units corresponding to the number of type slugs carried by each slide 931. Slides 931 (except the slide for printing the thousands digit) each carry a set of 13 type slugs 942 as illustrated, each having on its bottom or printing surface 944 the indicia shown immediately above the type slug. Printing surface 944 on each type slug is disposed for printing the various indicia on a paper or the like between slugs 942 and prism surface 928. As each slide is permitted to move a given number of units to the left, it carries a given type slug under the impact portion 945 of hammer 930, so that if hammer 930 strikes the type slug, the preselected and positioned slug will impress its corresponding mark on the paper.

The 13 type slugs carried by the units, tens and hundreds slides 931 include seriatim a slug for each of numerals 0 through 9, strike symbol "X", spare symbol "/" and foul symbol "F". The thousands slide 931 has only the digits 0 and 1 for the purpose herein since even total team scores will not reach two thousand.

Figure 11:
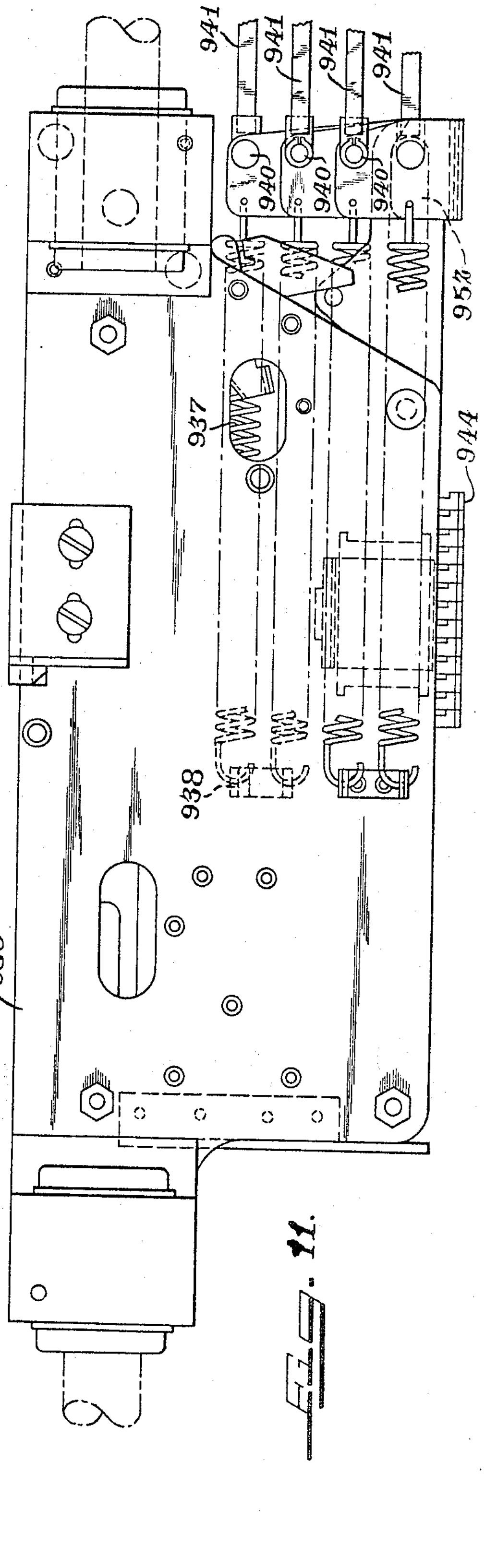
FIG. 11 is an enlarged side view of a print head in the apparatus of FIG. 3.
Figures 13, 14, 15, 16:
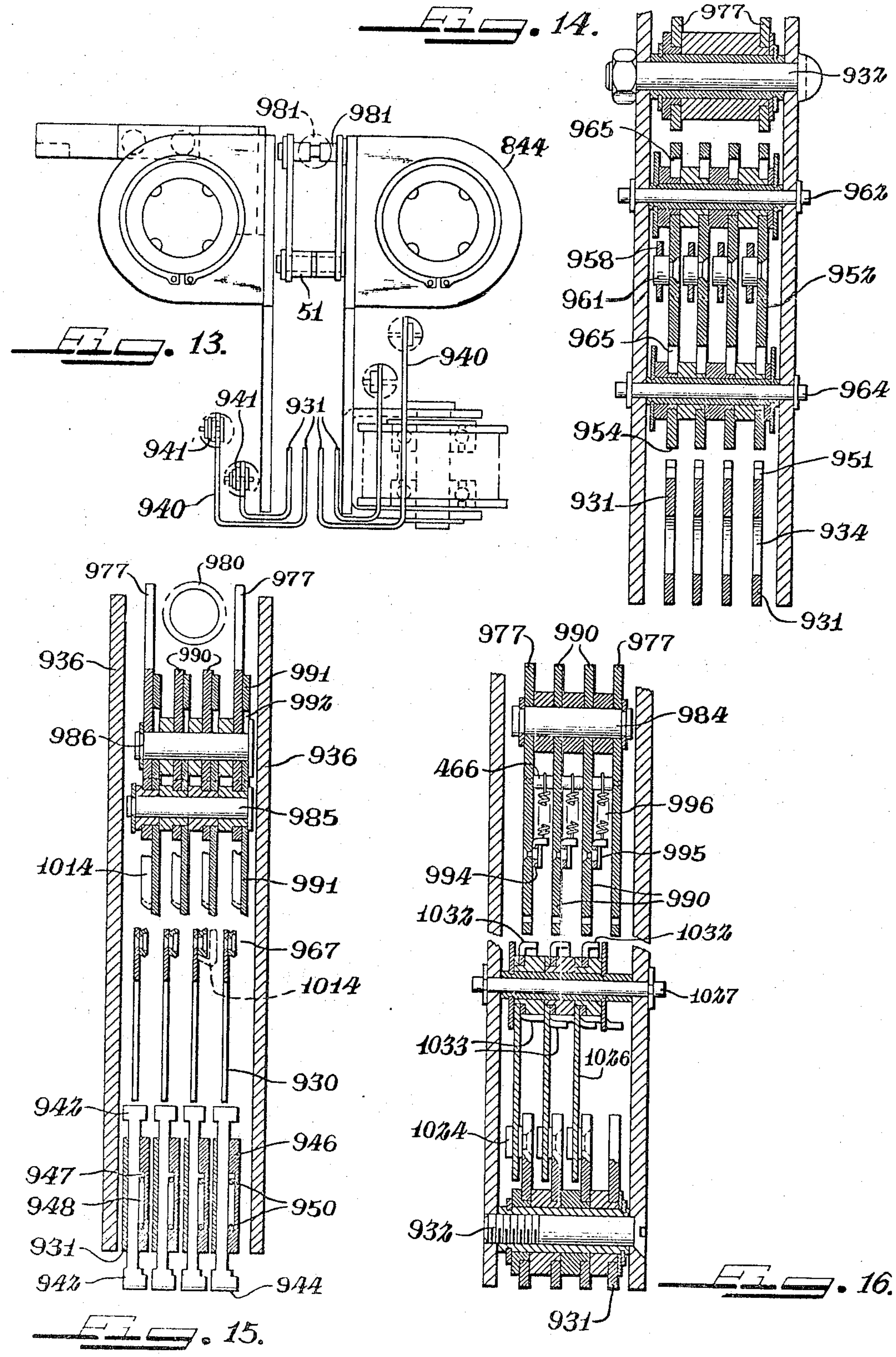
FIG. 13 is a view from the right end of FIG. 11.
FIG. 14 is a section along line 14—14 of FIG. 12.
FIG. 15 is a section along line 15—15 of FIG. 12.
FIG. 16 is a section along line 16—16 of FIG. 12.

As best seen in FIGS. 11 and 15, type slugs 942 are mounted between the slide 931 and a plate 946 mounted on slide 931 and spaced therefrom. Slugs 942 are vertically slidable between the plate 946 and slide 931, and each slug 942 has a projection 947 which projects into a recess 948. Recess 948 extends the length of plate 946 and is of sufficient height to accommodate a leaf spring 950 which normally urges projections 947 and type slugs 942 upward. It will be noted that a striking force on the upper end of any of the type slugs will force the type slug printing end downward to impress a surface therebelow; and spring 950, held in place by pin 949, will urge against projection 947 to return the type slug to its normal position as shown in FIGS. 11 and 15.

In order to precisely align the type slugs for exact alignment of printed appearance of digits in a score number to be printed on a score sheet, a plurality of aligning notches 951 are provided on an upper surface of each slide 931. The aligning notches are generally V-shaped, and one such notch is included for each type slug mounted on a slide 931. When tape 941 plays out and permits a slide 931 to move to the left as viewed in FIG. 12, a notch 951 will become generally aligned under a pointed plunger 951 having a pointed end 954. After alignment of the desired type slugs in a row beneath the striking portions 945 of hammers 930, as will be seen, lever 955 is actuated by leftward motion of pin 988 and pivoted counterclockwise about pin 956, mounted to frame 936, pivoting flange 957 out from beneath arm 958. Spring 960, biasing between arm 958 and lever 955 pulls arm 958 counterclockwise, urging pin 961, secured to plunger 952, downward carrying plunger 952 therewith. Plunger 952 is vertically slidable by its mounting on pins 962 and 964 through slots 965. Point 954 engages the notch 951 disposed therebelow and the configuration of point 954, being such as to tightly fit in the notch 951, cams the notch 951 to a central position thereby precisely aligning the type slug beneath the hammer impact projection 945. Point 954 will remain in notch 951 until the printing operation is complete, maintaining the proper alignment of type slugs with respect to each other in the parallel slides 931.

The hammer mechanism includes a hammer for each set of type carried by a slide 931. Thus, there are four hammer members 930, best seen with respect to FIGS. 11 and 15. Hammers 930 are pivotally mounted on pin 966 which is secured at each end through frame 936. A pin 967 is provided on each hammer for lifting the hammer to operate the hammer by letting it fall with impact portion 945 striking the top of the aligned type slug, hammer 930 pivoting on pin 966.

Figure 7:
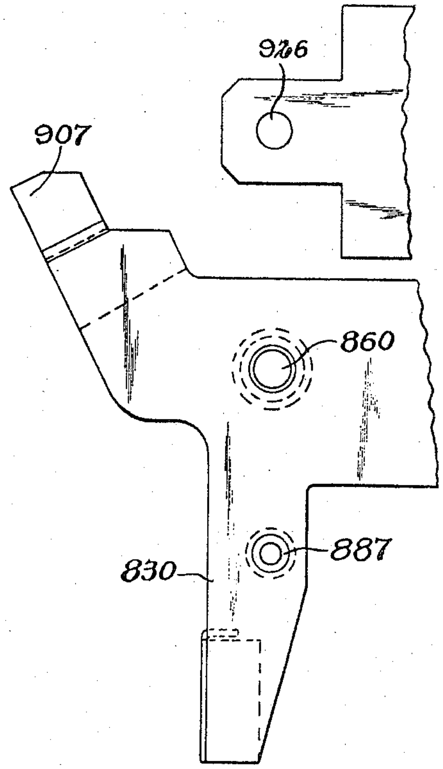
FIG. 7 is a view of a portion of the carriage positioning means from the right end of FIG. 6 with shaft 1037, chain 1039 and the sprockets removed.

Adjacent each hammer, a stop member 968 is also provided pivotally mounted on pin 966. Stop member 968 has a flange 970 projecting beneath the hammer to limit its downward travel and to lift it off the type slug after each impact. A pin 971, secured at each end to frame 936, projects through a limit slot 972 in each stop member 968 slightly elongate with respect to pin 971, so that when hammer 930 is lifted and dropped and strikes flange 970, stop member 938 will pivot slightly clockwise as viewed in FIG. 11 as permitted by the size of slot 972 on pin 971, thereby permitting hammer 930 to fall to a position slightly below that shown in FIG. 7 for striking the type and driving the type downward, sufficient to effect printing on a paper surface therebelow, but insufficient to transfer significant force of the printing hammer 930 to the glass surface 928.

Spring 974 is a tension spring connection between arms of stop member 968 and hammer 930 respectively to provide a resilient connection between the hammer and stop member. Further, the stop member 968 is grounded through spring 975 to pin 976 and secured at each end to frame 936 so that when hammer 930 is lifted and dropped on flange 970, stop member 968 pivots clockwise the amount permitted and tension in spring 975 is increased. After the momentum of hammer 930 is stopped by the stop member, the shock being absorbed by resistance of the type slug and by pin 971, spring 975 returns stop member 968 counterclockwise to the position of FIG. 11 with flange 970 lifting hammer 930 from contact with the type slug. Spring 974 assists in positive driving of the hammer downward and adds to the force of gravity when hammer 930 is released from its elevated position.

A spring-loaded mechanism is provided for lifting and dropping hammer 930 to effect the printing operation. Accordingly, a pair of slides 977 is mounted by elongate slots 978 on pins 932, best seen in FIGS. 11 through 15. The two slides 977 are secured parallel to each other in spaced relation to each other by pins 981, 982, 984, 985, 986, 987 and 988. A pair of intermediate members 990 of the same general configuration as the midportions of slides 977 are spacedly mounted and carried on pins 984 and 987, thereby secured between and in spaced relation to slides 977. Mounted to each of slides 977 and members 990 on pin 985 is a scoop member 991 having a lateral trough-like curved flange 1014 along a lower surface thereof. Each scoop member 991 includes an arcuate elongate slot 992 through which pin 986 projects, slot 992 being slidable over pin 986 to permit pivoting of scoop member 991 about its pivot point 985. A latch 994 for normally latching scoop 991 in its elevated position as shown in FIG. 11 is pivotally mounted to each of slides 977 and 990 by a pin 995. Latch 994 is normally urged in a clockwise direction to engage a latch receiving portion of scoop 991 by tension spring 996 extending between latch 994 and grounded to pin 997. The purpose of latch 994 will be discussed hereinbelow, but for the present, it will be assumed that latch 994 is pivoted counterclockwise, extending spring 996 for normal operation of the hammer. Each scoop 991 is normally urged in a counterclockwise direction by spring 1013 biasing between slides 977 or 990. With slides 977 and 990 held in their position to the right as in FIG. 12 by tape 998, scoops 991 are retained in elevated or clockwise position by a stop pin 1011 grounded at each end to frame 936.

A tension spring 980 is provided secured at one end to pin 981 on slides 977 and secured at the other end to pin 979 grounded to frame 936. With slides 977 in their home position, spring 980 is retained under tension by resistance of taut tape 998 secured to slides 977 by pin 982. Release of tension on tape 998 attached to pin 982, as will occur responsive to a print control mechanism to be described hereinbelow, permits tension spring 980 to drive slides 977 and 990 to the left as viewed in FIG. 12. As slides 977 and 990 travel to the left under the urging of spring 980, scoops 991 are carried clear of stop pin 1011 and springs 1013 urge scoops 991 downward. The end of the flange 1014 drops beneath pin 967, and pin 967 engages the interior of the flange 1014; and as slides 977 carry the scoops 991 further to the left, pin 967 rides up the trough to the end thereof and drops from the right-hand end of flange 1014 as viewed in FIG. 12. FIG. 15 shows the flange 1014 in phantom in a sectional view through pin 967. When hammer 930 falls from the upper end of flange 1014, the printing operation, as discussed above, is effected. However, in the meantime, pin 988 has engaged lever 955 to actuate the aligning device driving member 952 with its pointed camming surface 954 into notches 951 to precisely align the type before being struck by hammer 930.

Although only two of the levers 955 project up for engagement by pin 898, the other two levers 1017 are secured thereto by a pin 1016 and are of the same general configuration therebelow as the levers 955, all levers 955 and 1017 pivoting about pin 956 in the above described manner.

Figure 12:
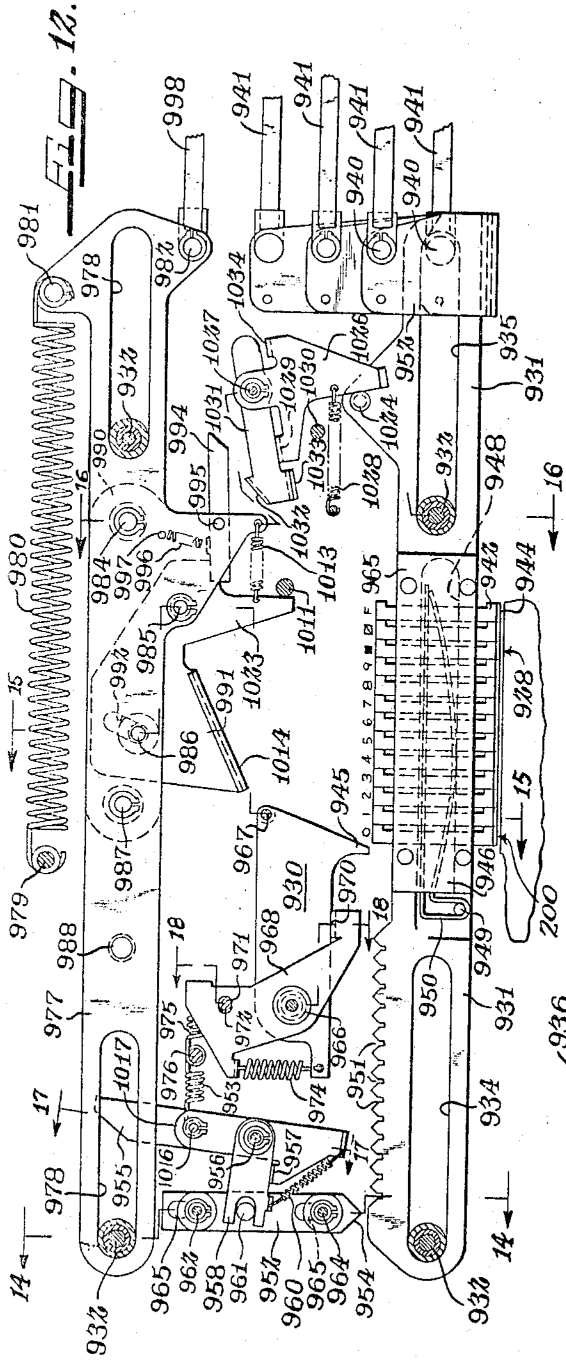
FIG. 12 is a section taken behind the front casing plate of the print head of FIG. 11, showing internal parts.

The print head is reset by returning slides 977 to the right to the position of FIG. 12 by pulling tape 998 by slide 1021 and pulley 1022 mounted thereon, in an operation which will be described hereinbelow. As slides 977 are pulled to the right, pin 988 disengages lever 955; springs 953 pull levers 955 clockwise about pin 956, flange 957 lifting arm 958 which in turn lifts arm 952 from engagement with notches 951. Tapes 941 are also pulled at this time by slides 1018 and pulleys 1019 mounted thereon to return slides 931 to the right to the position shown in FIG. 12. As slide 977 progresses further to the right, the lower arm 1023 of the scoop 991 engages stop pin 1011, and scoops 991 are thereby pivoted clockwise about pin 985 to the position shown. During their return, scoops 991 may ride by flanges 1014 over pin 967 of hammer 930 so that spring 975 is of sufficient strength to retain hammer 930 against pivoting. At home position, scoops 991, as will be seen, will also be relatched by latch member 994 in those cases where the latch member has been released.

In the printer head assembly, apparatus is provided for normally suppressing the printing of zeros by the printing head. Such apparatus functions to suppress printing of zeros where zeros are not desired, e.g. in the thousands and hundreds columns where the total to be printed is less than 100 or in all columns other than units column where the total to be printed is less than ten. Accordingly, a pin 1024 is provided on each slide 931 for printing tens, hundreds and thousands, pin 1024 being eliminated from the slide 931 for printing units. With slide 931 in position aligning a zero with the printing hammer, pin 1024 blocks the clockwise pivoting of lever 1026 about pin 1027 under urging of tension spring 1028 grounded to suitable framework. As the slide 931 carrying pin 1024 is moved away from the zero position, pin 1024 no longer blocks the clockwise urging of lever 1026. With pin 1024 moved away from blocking position, lever 1026 is free to pivot clockwise toward stop pin 1030, as urged by spring 1028, and surface 1029 lifts arm 1031 upward so that flange 1032 engages lever 994, pivoting lever 994 counterclockwise about pin 995 against urging of spring 996 to unlatch lever 994 from holding scoop member 991 against dropping. Scoop 991 is then permitted to drop for printing of the digit. On arm 1031 there is provided a second lifting flange 1033 which extends laterally from each of the thousands and hundreds levers 1031 to closely underlie the flange 1033 on the next lower order of arm 1031, i.e. the hundreds and tens arm 1031, respectively. Thus, each time one of the three arms 1031 is lifted, it carries each arm 1031 of a lower order upward with it to unlatch the scoops and cause printing of zeros, printing of zeros being otherwise suppressed by abutment of pin 1024 against lever 1026. Each arm 1031 pivots on pin 1027 independent of the pivotal movement of lever 1026 for a sufficient number of degrees to trip lever 994 without being stopped by pin 1024 as is seen by the gap between the abutting flange 1034 and arm 1031. It is apparent that the printing of a digit greater than zero in a higher order permits printing of zeros in all lower orders and that zeros are suppressed in all orders above the highest order in which a digit greater than zero is to be printed.

For operating the print head 832, there is provided an operating mechanism which is indicated generally by reference number 835 (FIGS. 3 and 19) but which also extends by means of a plurality of operating tapes 998 and 941 to the printing head (FIGS. 11 and 12) carried by the above described carriages.

The print head control or operating mechanism (FIGS. 3 and 19 through 23) for setting type in the print head and for actuating the hammer is driven by a shaft 1036 which rotates one revolution per print cycle. Shaft 1036 is driven by shaft 1037 through solenoid actuated one revolution clutch 1038. Shaft 1037 is in turn driven through sprocket 1039 from constantly driven shaft 860. Actuation of the one-revolution clutch solenoid PDS initiates the one-revolution cycle of shaft 1036, i.e. the print cycle. Solenoid PDS is actuated through a time delay by a signal from the computer of Cornell et al., cited above, by closure of a print signal switch such as switch SWPR. Switch SWPR represents each of switches PTM, PFS and PBS in the Cornell et al. computer.

Figure 23:
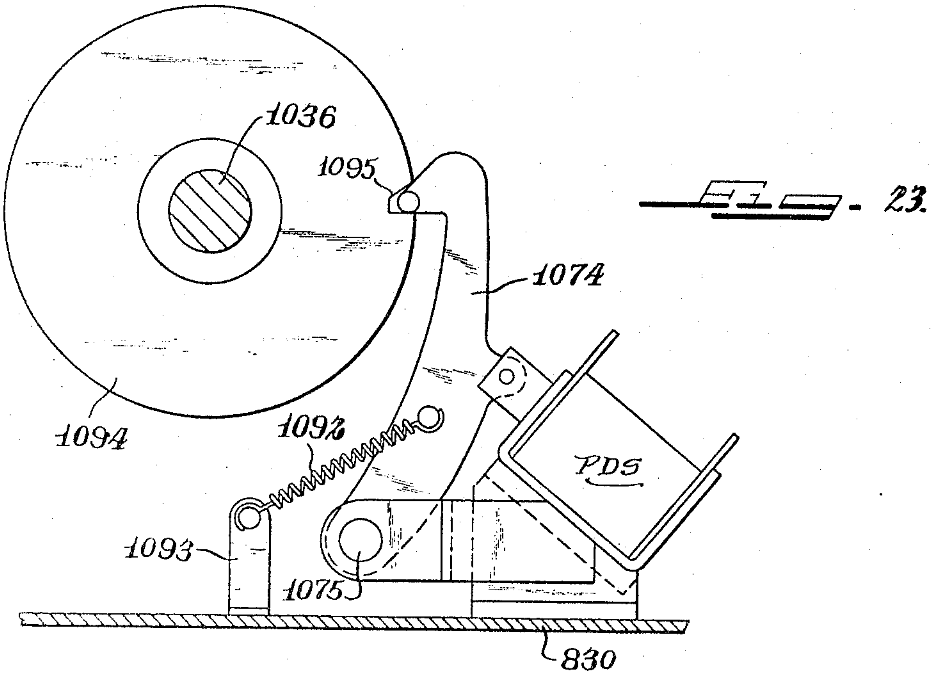
FIG. 23 is a section along line 23—23 of FIG. 19.

In FIG. 23, one revolution clutch 1038 and its actuation by solenoid PDS is shown in more detail. Upon energization, solenoid PDS pulls in latch member 1074 to pivot clockwise on pin 1075 against the urging of tension spring 1092 biasing between member 1074 and a bracket 1093 secured to frame 830, disengaging notch 1095 and permitting clutch member 1094 to rotate clockwise, carrying shaft 1036 therewith. During the first portion of the revolution of the clutch member 1094 solenoid PDS is de-energized and latch 1074 rides on the edge surface of member 1094. At the end of the one revolution, notch 1095 is re-engaged by latch 1074 to stop member 1094 and shaft 1036. The complete clutch is not shown in detail, but it will be apparent from the description hereinabove that a conventional clutch mechanism is used, e.g. similar to that shown in FIG. 8.

As shaft 1036 rotates through one revolution, cams 1041, 1042, 1043 and 1044 are rotated through one revolution. Each of cam followers 1046 and 1047 is mounted on a slide 1048 or 1049 having elongate slots 1051 slidable over pins 1052. Cam followers 1046 and 1047 are slidably mounted on pins 1052 by elongate slots 1051 for slidable movement toward and away from cams 1041 and 1042. Followers 1046 and 1047 are spring-urged normally forward, i.e. toward the cams, for following the cams during rotation of the cams. During cam rotation, followers 1046 and 1047 are urged rearward, with 1046 leading, by rises of cams 1041 and 1042 and toward shaft 1036 on falls in the cams, urged by springs 1053 and 1054.

Cam follower 1047 will control actuation of the printing hammer. To control the hammer actuation system, slide 1049 deviates laterally to a bifurcated portion 1057 having a pin 1058 therethrough. Hooked end 1056 of slide 1018 abuts pin 1058. The other end of slide 1018 is bifurcated and carries the pulley member 1022 pivotally mounted at 1062 having a tape 998 extending therearound. Slide 1018 is slidably mounted on a pair of pins 1063 and 1064 through elongate slots 1066.

Similarly, slide 1048 is slidable on pins 1052 via slots 1051 and carries a pin 1067 on a lateral deviation. Hooked ends 1056 of a plurality of four slides 1021 abut pin 1067. The four slides 1021 are each independently slidable on pins 1063 and 1064 via slots 1066 and are of the same general configuration as slide 1018, including the hooked ends 1056 and the pulleys 1019 pivotally mounted within the bifurcations of ends 1059. Slides 1021 each include a ratchet edge 1068, each tooth of which represents one unit of movement of slide 1021. A magnet TS–1, TS–10, TS–100 or TS–1000 is mounted on suitable framework adjacent edge 1068 of each slide 1021. Each of magnets TS has its core end 1069 disposed adjacent and facing a flange 1071 on a latch member 1072 pivotally mounted at 1073. Latch member 1072 is disposed to engage and disengage ratchet 1068 upon pivoting clockwise and counterclockwise about pin 1073, respectively.

During the first phase of the print cycle, the type is aligned, and during the second phase, the print hammer is actuated to print the score information reflected in the aligned type.

Figure 19:
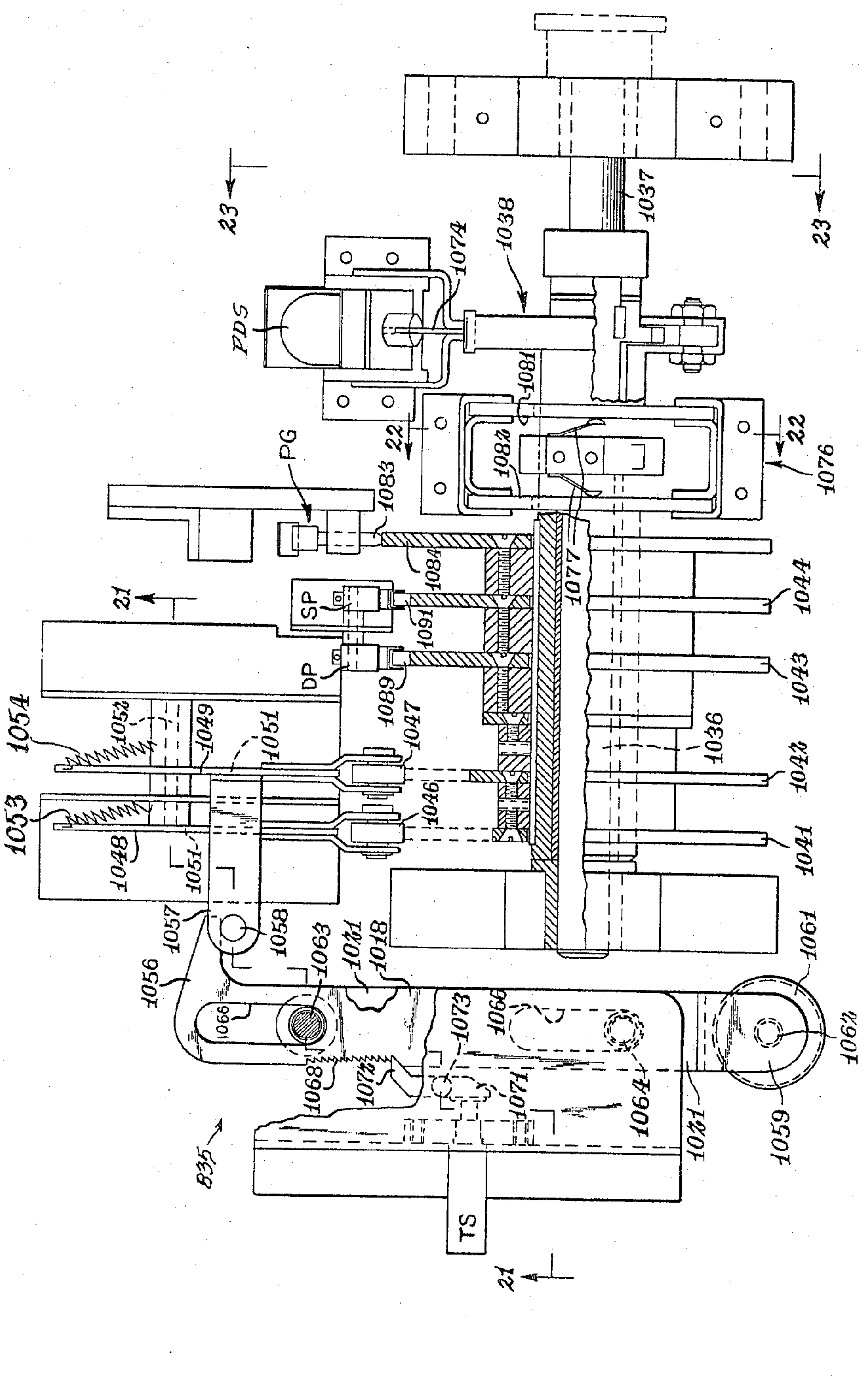
FIG. 19 is another enlarged portion of the plan view of FIG. 3 with parts in section and showing a type setting and printing control mechanism.
Figures 20, 21:
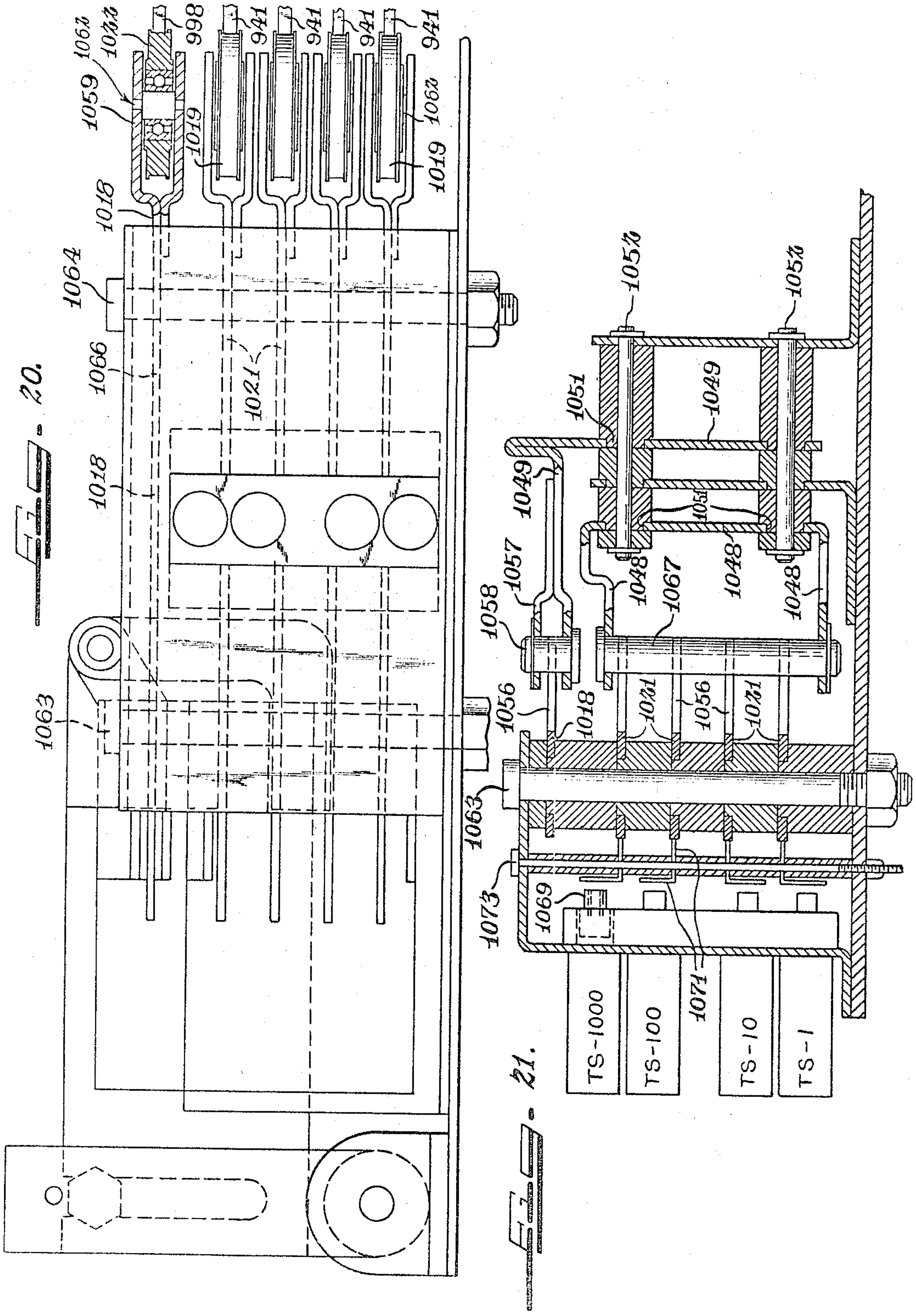
FIG. 20 is a side view of the type setting and printing control mechanism of FIG. 19.
FIG. 21 is a section along line 21—21 of FIG. 19.
Figure 22:
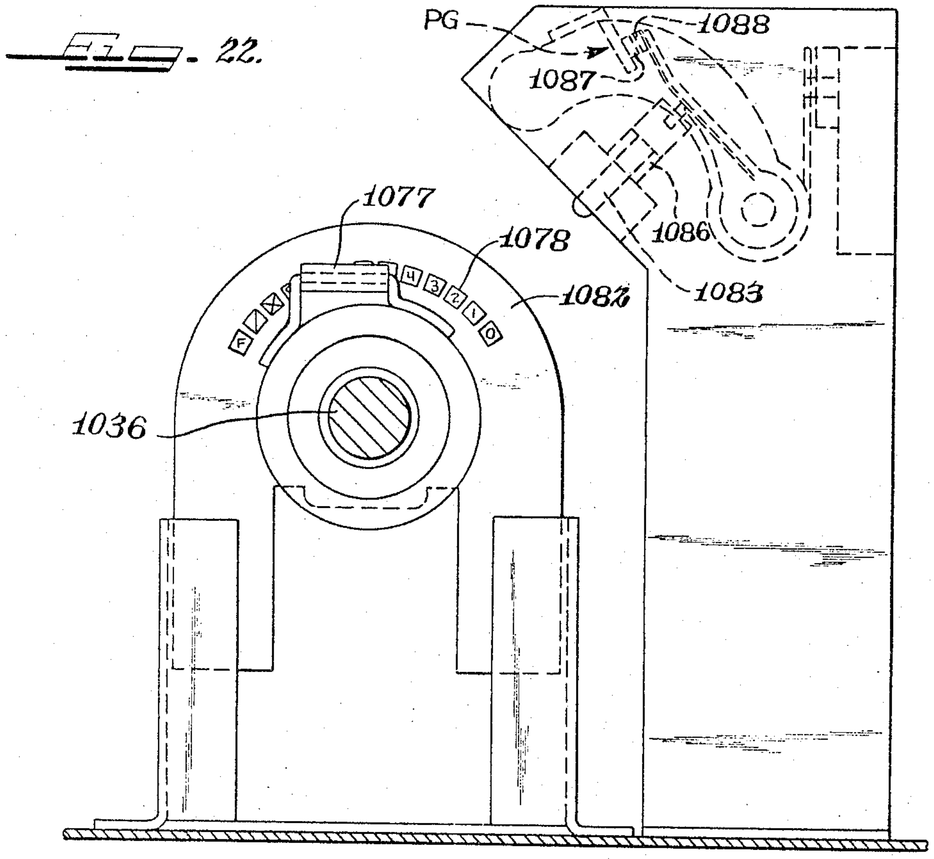
FIG. 22 is a section along line 22—22 of FIG. 19 also showing positioning of a pulse generator contact assembly.

At the beginning of the print cycle, followers 1046 and 1047 are on rises of cams 1041 and 1042, respectively. As cam follower 1046 falls on cam 1041, pin 1067 is moved forward, magnets TS being de-energized and latches 1072, normally spring-urged in a counterclockwise direction as viewed in FIG. 19, are disengaged from ratchets 1068. During the travel of pin 1067 forward, energization of any of the magnets TS will pivot latch 1072 into ratchet 1068 and hold the slide 1021 against following pin 1067. Meanwhile, follower 1047 continues on a rise holding pin 1058 and slide 1018 against movement in a rearward position.

Each of slides 1021 or 1018 is under tension from the typesetting springs 937 or scoop travel spring 980 in the printing head through a tape 941 or 998 which extends around a pulley 1022 or 1019 pivotally mounted at end 1059 of slide 1021 or 1018.

A circular commutator 1076 is mounted on the printer frame. Commutator 1076 includes a wiper member 1077 which wipes a plurality of contacts, one corresponding to each digit or other indicia printable by the printer. Wiper 1077 is mounted on shaft 1036 and wipes these contacts identified by reference numeral 1078. Wiper 1077 also wipes a continuous hot contact 1079 on a wall 1081 of commutator 1076 facing the wall 1082 on which contacts 1078 are mounted. These contacts are diagrammatically illustrated in FIG. 27.

The contacts 1078 are angularly disposed in an arc for wiping by wiper 1077 and are disposed so that the "zero' contact is wiped as follower 1051 begins to ride on the fall of cam 1041. The remainder of the contacts are spaced from each other a distance corresponding to the amount of rotation required by shaft 1036 to rotate cam 1041 an amount sufficient to permit slides 1021 to move forward one unit. Each unit of movement of a slide 1021 corresponds to the amount of movement required to permit the next digit or indicia to become aligned with the printer hammer for printing by the printer head. Thus, the total movement of slide 1021 is thirteen units, one unit for each indicia provided or one unit for each unit of movement of slides 931 in the printer head.

As the four slides 1021 slide on pins 1063 and 1064, each slide will come to a position in which the proper digit is aligned in the printing head to be struck by the printer hammer. This proper position is detected through commutator 1076 and the circuitry in FIG. 27. Accordingly, for magnets TS–1, TS–10 and TS–100, the commutator completes a circuit with the matrix MAT–1 (FIG. 27) through the contacts riding on the matrix, which contacts have been properly positioned by a control system such as the Cornell et al. computer, to correspond to the score value to be printed. For magnet TS–1000, the commutator completes a circuit through a pair of contacts 1000 K–1 which are maintained by the computer in the positions shown in FIG. 27 while printing scores less than 1000, but are reversed by the computer for printing scores of 1000 or greater. Completion of the circuit energizes the appropriate magnet TS–1, TS–10, TS–100 or TS–1000 to pivot latch 1072 into ratchet 1068 and hold slide 1021 against further sliding while pin 1067 continues forward. Thus, the proper digits are positioned in the printer head for printing.

Follower 1047 proceeds off its high on cam 1042, while follower 1046 is riding on the low dwell of cam 1041, to release slide 1018 under tension of spring 980 to cause printing of a score by the type as set. Followers 1046 and 1047 proceed up the rises near the end of the print cycle. Pins 1058 and 1067 engage hooks 1056 on slides 1021 and 1018 and return slides 1021 and 1018 rearward until at the top of the rise and end of the cycle slides 1021 and 1018 are in their rearward position shown in FIG. 19.

When the print signal is received from the computer, it is desired to print the score on the score sheet. The print signal, after a delay to assure arrival of print head to proper X–Y position, energizes magnet PDS, releasing clutch 1038 for one revolution of shaft 1036, permitting alignment of the type by slides 1021 and permitting the slide 1018 to slide forward under the urging of spring 1078 in the printer head, causing the printer scoop to slide across the printer head and effect the printing operation.

Latches 1072 remain in ratchet 1068 even after de-energization of magnet TS until slide 1021 is returned against the urging of the printer head springs. As the slides 1021 return after the printing operation, and at the initiation of the next printing cycle, latches 1072 are spring-urged out of engagement with the ratchet 1068.

A pulse generator switch PG is mounted for actuation by plunger 1083 which rides on a cam 1084. Cam 1084 includes a fall at every point where the commutator wiper is aligned with a contact and the slide bar 1021 is precisely aligned with a tooth of ratchet 1068 in exact alignment for engagement by latch 1072. At this point, plunger 1083, under urging of spring 1086, drops into a fall on cam 1084 and immediately rises to a high. While plunger 1083 is in the fall, contacts 1087 and 1088, which contacts are ignition points and comprise switch PG, send a momentary pulse to the appropriate magnet TS to latch the appropriate slide 1021. The pulse generator system assures that the slide 1021 will be latched in the desired correct disposition and prevent arcing between commutator contacts.

Switch DP is a normally open switch which closes once during each revolution of cam 1043, i.e. at the termination of a complete print cycle. Switch DP is actuated by a cam follower 1089 which follows cam 1043, cam 1043 having a fall at the end of the cycle. Switch DP is the source of a done-printing signal sent to the computer to inform the computer the printing operation is complete and is identified in the Cornell et al. application Serial No. 366,297 by the same DP letter designation.

A time delay circuit is provided for preventing the print signal from causing printing before the print head carriage has been positioned in correct alignment for the desired printing operation. Accordingly, when print signal switch SWPR is closed by the computer, the signal is not immediately sent to print hammer solenoid PDS. Switch SP, operated by cam follower 1091, following cam 1044 on shaft 1036 is closed at the beginning of the print cycle and opens soon after the cycle is initiated and is reclosed immediately prior to completion of the print cycle as cam 1044 rotates. Referring especially to FIG. 26, with switch SP closed prior to and at the beginning of the cycle, relay SPK is energized and contact SPK–1 is closed, energizing relay PK which is latched closed through print signal switch SWPR. Energization of relay PK closes contact PK–1 to hold relay PK through switch SP while contacts PK–3 and PK–4 are broken cutting out the print signal switch SWPR and the 25 ohm resistor paralleling relay 2PK. Contact PK–2 is closed actuating relay 2PK through time delay comprising a resistor in series with relay 2PK and a condenser paralleling relay 2PK. Contact 2PK–1 closes to energize solenoid PDS for starting rotation of shaft 1036 and cam 1044. Cam 1044 opens switch SP, de-energizing relays SPK, PK and 2PK and breaking the circuit to solenoid PDS. At the end of the cycle, the print signal from switch SWPR will have been discontinued keeping solenoid PDS de-energized until a new print signal is received. Thus, the printing action is delayed until actuation of relay 2PK to give the printer head and type sufficient time for proper printing address.

The wiring of FIGS. 26 and 27 is connected at contact K. Referring especially to FIG. 27, in MAT–1, as in MAT–2 described below, a surface 1097 having a printed circuit in the form of electrically conductive strips HS forms a lower level on which readout contacts 1096 and 1096*a* (shown in phantom) may be positioned by a computer, while another surface 1098 having electrically conductive printed circuit strips VS is spaced above and parallel to surface 1097; the readout contacts 1096 and 1096*a* are moved by the computer in contact with both surfaces. These strips and readout contacts are similarly identified in the Cornell et al. application and the positioning of the contacts along the strips by the Cornell et al. computer is also described by Cornell et al. Proper alignment of the printed circuit surfaces will be apparent and, in the illustrated matrices, may be accomplished by pivoting surface 1098 facially against surface 1097 from the position shown generally along the phantom line between surfaces 1097 and 1098 and then raising surface 1098 for securing at a proper spaced distance above surface 1097, depending on the height of the readout contacts 1096 and 1096*a* with the reference corner lines, *a*, *b*, *c* and *d*, respectively, in vertical spaced registry.

The separate contacts 1096 are illustrated in their home or zero position in phantom in FIG. 27 and are carried by the computer along strips HS–BS, HS–M, HS–MT, HS–U, HS–T and HS–H from left to right as viewed in FIG. 27. Each unit of a score digit to be printed carries the contact a distance from the center of one strip VS to the next. For readout of information, a circuit is completed between the strip HS and one of the strips VS by each contact determining the digit to be printed in units, tens or hundreds positions. Switches CBS, CTM, CFS, F–12, P10L–9, and P10R–9, relay 1000K and relay contacts 2CARK–1 and 11, CALK–1 and 11, FCLK–3 and –4, FCRK–3 and –4, F10K–2 and –3, CK–7, 2BK–3 and –4, and 1000K–1 are operated by a computer in the manner described by Cornell et al. Contacts 2CALK–1 and 2CARK–1 energize the BL and BR identification switches in accord with proper lane identity of the information being processed by the computer. Switches P10L–9 or P10R–9 is opened by the computer whenever ten pins are knocked down to prevent printing of box score.

The contacts 2BK–4 are shown in a position for printing a "strike" symbol responsive to a pinfall of 10, as would be the case on a first ball of a frame. The computer controls these contacts and reverses them from the positions shown on second ball condition to cause printing of a "spare" symbol responsive to a pinfall of 10.

On occurrence of a foul, the computer closes FCLK–1 or FCRK–1 and opens FCLK–2 or FCRK–2 for left or right lane foul respectively, to transfer the print symbol designation from numerical printing (through MAT–1) to "foul" printing so that the printer prints the letter "F" in the appropriate box, switch CBS being closed, in lieu of the numerical value.

Data for transmission to the printer for directing the printing position and the identity of indicia printed is generated by a computer, e.g. the Cornell et al. ocmputer as indicated above, by the contacts completing circuitry in a matrix on a circuit board, in accordance with the score information to be printed. In general, upon completion of a computation to a point where it is desired to print the computed score information, a contact completing a circuit between electrically conductive horizontal strips HS and vertical strips VS of MAT–1 is moved along a strip HS one unit for each unit of magnitude of the digit desired to be printed in the corresponding position on the score sheet. For example, where a total frame score of 126 has been computed and is ready for printing, a contact is moved six units along HS–U to complete a circuit with VS–6, another contact is moved two units along HS–T to complete a circuit with VS–2, and still another contact is moved one unit along HS–H to complete a circuit with VS–1. In like manner, where sixteen team marks have been computed and it is desired to print the number of marks, other contacts are moved along HS–M and HS–MT to complete electrical circuitry with VS–6 and VS–1, respectively. For printing box scores after each ball of a frame, a contact is moved along HS–BS one unit for each pinfall count after bowling each ball.

Turning to FIG. 26, the computer also completes a printed circuit between upper surface 1097 and lower surface 1098 constituting matrix MAT–2. A single contact 1096*a* is positioned by the computer in accordance with the frame in which the bowler is bowling, i.e. by formula cams and based on the bowler's state. The disposition of contact 1096*a* on circuit boards or surfaces 1097 and 1098 translates the frame information in the computer to electrical control for aligning the printer to print in the proper frame. Strip 1097–2 is connected to power through switch CK–7 which is closed by the computer after contact 1096a is in proper position. For greater compactness, the strip 1097–1X for solenoid 1XS has been placed on surface 1097 rather than 1098 where the strips for the remaining solenoids are located. The computer positions contact 1096a so that correct information is sent to the printer with respect to identity of proper position for printing on the score sheet. The contact 1096a tracks strips 1907–2, 1097–1X, 1098–2X, 1098–4X and 1098–8X to energize the appropriate one or more of solenoids 1XS, 2XS, 4XS and 8XS from the power strip 1097–2 depending on the positioning of the contact 1096a by the computer.

During operation of the scoring system, score sheet 200 (FIG. 2) is disposed on surface 928 (FIGS. 12 and 24), for printing thereon by the printing type 942 thereabove. The printer head assembly may be provided on hinges, e.g. as shown at 839, (FIG. 3) to open out of the way giving better access to the surface 928. Score sheet 200 is a two-team score sheet, the upper grid being for scoring bowlers on team A and the lower grid for scoring bowlers on team B. The printer head, as described above, is moved along X axis for positioning the type over the appropriate frame box or score sheet 200. It will be apparent that the score sheet 200 bears a relation to the amount of movement permitted by tapes X and Y in that winding of tape T–Y on spool 927 causes travel of the head to the next scoring frame, from left to right, as viewed in FIG. 2.

Likewise, reeling of one Y unit of tape T–Y onto spool 905 causes movement of the printer head from one bowler's score line to the next bowler's score line. Such movement is effected by the X and Y solenoids at the printer head positioning mechanism. The movement of one unit Y will move the printer head in alignment with the next bowler's score line, and multiple units of winding or unwinding of tape T–Y will move the same multiple lines upward or downward for positioning a new scorer's line beneath the printing head. The Y movement mechanism is also provided with means for moving one-half line, i.e. one-half unit in the form of solenoid 1/2YS by closure of switch 1/2YK–1, e.g. by the score computation and control system disclosed by Cornell et al. in the above mentioned Serial No. 366,397. Thus, although the printer head is positioned by a whole number of units on the Y tape in alignment with boxes 201, 202 or 204, the solenoid 1/2YS, when actuated, repositions the head one-half the distance between lines of such boxes, i.e. in space 203, for printing running game total. Team total marks are printed in line 206 on a whole integer of Y movement. The space between the lower grid line of the team A portion of score sheet 200 is a whole number of Y directional movement units from the top grid line above the name and frame indications of the team B portion therebelow so that the printer is positionable over both score sheet portions using the same units of movement of tapes T–X and T–Y. In Y direction, the control of the printer is arranged to move the printer an extra Y unit each time it is to move between the two team portions of the score sheet.

Although fractional movement of the carriage could be effected by simple expansion of the system for differentiating in printing between boxes 201, 202, and 204, no such fractional movement in the X direction is necessary since other provision has been made for differentiating between these boxes during printing. Accordingly, in each of the ten frames, indicia is printed in the first ball box 201 by the 10's hammer and type line and in the second ball box 202 by the unit's hammer and type. For third ball of the tenth frame, results are printed in box 204 in the 11th frame by the 100's hammer and type. In printing frame scores and game totals where a plurality of digits may be needed for one score number, the unit's, 10's and 100's hammer and type mechanisms are used for printing in their respective digit positions simultaneously. The game totals for each player are printed in area 203 of the 10th frame for the respective player. Each game total of a preceding player is added to that of succeeding players on the same team as the players finish their game and the subtotals are printed in boxes or columns 205a and 205b, giving a complete team total in these columns opposing the name of the last player of the team. Team marks totals are, as indicated above, printed in line 206. No provision is made in the printing system for printing bowlers' names in the presently illustrated form; however, such a feature may readily be added, if desired. It is intended that the player's names be hand-printed upon the score sheet after placement of the score sheet on surface 928, e.g. with the printing carirages moved out of the way.

During bowlout scoring in the tenth and subsequent frames, only box scores are printed until after the last ball of the game. During this period, the channel to the printer is provided through switch CBS which is closed each time the information is to be printed. However, because of the possibility of three balls being bowled and the possibility of up to three frames being completed during bowlout and because the score for all such balls and frames is printed in the column for frame 10 on score sheet 200, an additional box 204 is included for each player in the 11th frame area. Box 204 has a different printing position from boxes 201 or 202 and, as is apparent from the wiring diagram of FIG. 27, the 100's printing type and hammer can be used for printing in this box 204. The computer controls the printer for printing in the proper position in each frame.

For purposes of exemplifying control of the operation, the control system of the above-mentioned Cornell et al. application Serial No. 366,297 has been modified for simplification to permit operation without the precise 11th and 12th frame control provided during bowlout by the Cornell et al. system. It has already been noted that scoring of the third ball for the 10th frame is done by the present system in the 11th frame box 204. This is accomplished in the illustrated diagram of FIG. 27 by reversing contacts F10K–2 and F10K–3, e.g. by the computer, for scoring the results of the third ball of the 10th frame in box 204 by the 100's type. The matrix MAT–2 accomodates positioning of the printer head to the column of areas 205a for such printing in box 204 and also thereafter accommodates positioning of the printer head into the column of areas 205b for printing totals. With respect to area 205b, when the printer head is positioned for printing in this area, any thousands digit present in the total score will overlap and be printed in area 205a.

Figures 17, 18, 24:
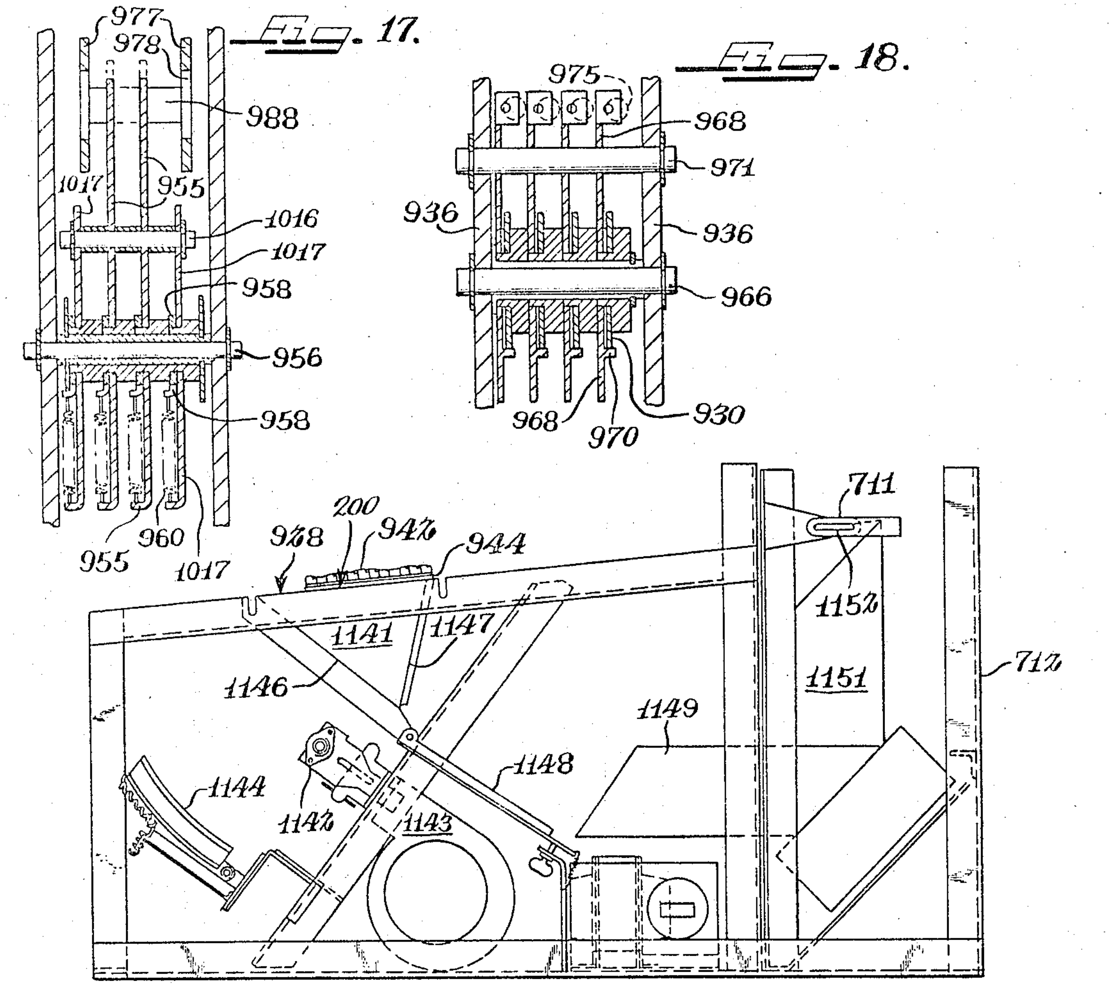
FIG. 17 is a section along line 17—17 of FIG. 12.
FIG. 18 is a section along line 18—18 of FIG. 12.
FIG. 24 is a side view of a projection apparatus for projecting printed information to a viewing screen.
Figure 25:
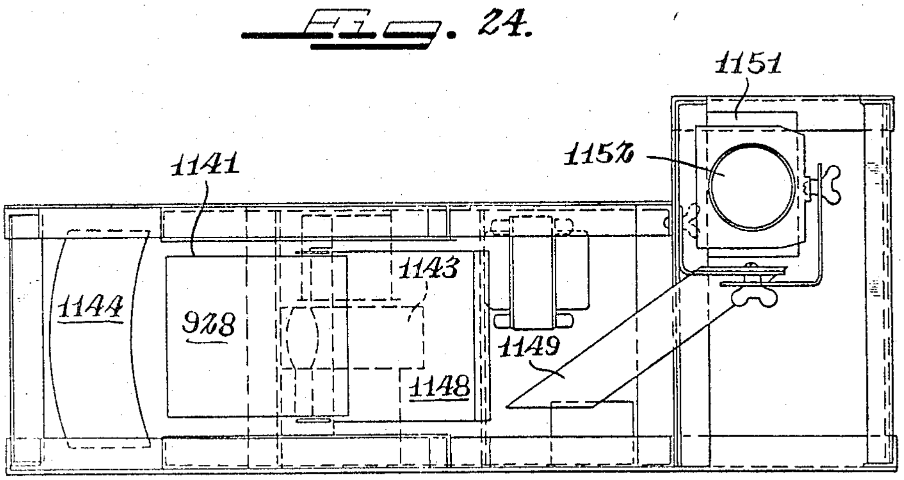
FIG. 25 is a top view of the apparatus shown in FIG. 24.

The projection system shown for use with the printing system is also mounted in casing 218 (FIG. 1) and employs an internally reflective platen surface 928 as a source of the image to be projected. In the form of such system shown, the internally reflective platen surface is a face 928 of a prism 1141. The system is such as that described by Jack A. Russell in application Serial No. 365,960 filed May 8, 1964, entitled "Projection Apparatus." The projection system is best illustrated by reference to its operation. As has been shown, printing slugs 942 will print by means of the indicia on the printing ends 944 on a surface disposed on surface 928. As shown in FIG. 24, a score sheet 200 is placed upon the surface 928 underlying printing ends 944 over slugs 942. The printer positions the slugs and the head for registry with the score sheet and for printing in the appropriate place on the score sheet. For this purpose, the score sheet is of such size that when its edges are within registry with a frame (not shown) over surface 928, the score sheet being the same size as the internal opening in the frame, the score sheet is properly positioned with respect to the printing positions of the printer for printing in the appropriate boxes thereon.

Paper or score sheet 200 has a carbon backing which, when impressed from the printing side, causes deposition of carbon on the surface 928 of prism 1141 thereby interrupting the internal reflectivity of the surface and creating an image thereon.

A projection lamp 1142 is mounted from the frame 1143 for projecting light to curved mirror 1144. Curved mirror 1144 reflects the light through face 1146 of prism 1141 and the light travels through the prism to face 928 where it is internally reflected through face 1147 of prism 1141. The angle at which light from mirror 1144 impinges surface 928 is at or below the angle of total internal reflectivity of the prism surface. Blower 1143 cools the projection lamp and adjacent optical elements.

Light passing through surface 1147 has picked up the image from surface 928 and is reflected by an adjustable planar mirror 1148 to a right angle mirror assembly. The right angle mirror assembly includes planar mirrors 1149 and 1151 which are mounted at right angles to each other for proper reversal of the image for projection to the screen. The image is first reflected from the generally upwardly disposed surface of mirror 1149 and thence from the generally upwardly disposed surface of mirror 1151 and is thereby directed through projection lens 1152 mounted across the light path from mirror 1151. The image, being projected upward, leaves casing 218 by way of port 219 (FIG. 1) and is thereby reflected by a mirror 220 to viewing screen 221. Mirror 220 and viewing screen 221 are suitably mounted from a ceiling or other overhead structure. The prism 1141, blower 1143 (carrying projection lamp 1142) curved or elliptical mirrors 1144, mirror 1148, the right angle mirror assembly 1149 and 1151 and the projection lens 1152 are all suitably mounted by bracket means not described herein in detail.

As to the electrical circuitry for projection lamp 1142 and motor of blower 1143, such circuitry is conventional in projection devices and is not described herein.

I claim:

1. A printing system for printing bowling score information on a score sheet comprising a printing head, a plurality of arrays of type elements each array including a plurality of type elements, means mounting each array of type members in said head for individual movement of each array to move a selected one of the type elements of the array to a printing station adjacent the score sheet, hammer means mounted for movement for striking type at said station for printing on the score sheet, a plurality of first separate tape means, one for each array, for transmitting moving force to said arrays, second separate tape means for transmitting moving force to said hammer means, means for driving said first tape means and subsequently driving said second tape means, means for storing predetermined score information, separate latch means for blocking movement of each of said arrays by the corresponding first tape means, and control means for comparing movement of type with stored information and actuating said latch means to block movement of each array upon arrival of the type element of the array at said station corresponding to the stored information whereby subsequent driving of said second tape means prints indicia on said score sheet corresponding to stored information, said control means thereafter deactuating said latch means.

2. A printing system for printing bowling score information on a score sheet comprising a printing head, a plurality of arrays of type members each including a plurality of type members, means mounting each array of type members in said head for individual movement to move a selected one of the type members of the array to a printing station adjacent the score sheet, means for actuating type at said station for printing on the score sheet, means for holding type at said station during actuation by said actuating means, means for moving each of said arrays, means for driving each of said moving means, means for storing predetermined score information, means for controlling movement of each of said arrays by said moving means for positioning proper type at said station to print stored information whereby subsequent actuation by said actuating means prints indicia of the held type on said score sheet corresponding to stored information, and means for comparing stored score information with the type positions on movement of the proper type to said station.

3. A printing system for printing bowling scores on a score sheet, which system comprises a printing head, means defining a score sheet support surface, carriage means mounting said printing head for movement relative to said surface along X and Y axes, separate first tape means for producing such relative movement along each axis and driveable for simultaneously producing such relative movement along both X and Y axes, binary drive means for driving said tape means in predetermined units of distance, selector means for selecting the desired units of movement along each axis, control means for controlling said driving means to simultaneously drive said separate tape means for simultaneous movement of said head relative to said surface along X and Y axes a distance corresponding to the selected units of movement, a plurality of arrays of type members each including a plurality of type members, means mounting each array of type members in said head for individual movement to move a selected one of the type members of the array to a printing station adjacent the score sheet, hammer means mounted for movement for striking type at said station for printing on the score sheet, a plurality of separate second tape means, one for each array, for transmitting moving force to said arrays, separate third tape means for transmitting moving force to said hammer means, means for driving said second tape means and subsequently driving said third tape means, means for storing predetermined score information, control means for controlling said drive means to transmit force through said second tape means for moving said arrays to position the proper type member of each array at said station corresponding to the stored information whereby subsequent driving of said third tape means prints indicia on said score sheet corresponding to stored information.

4. A printing system for printing bowling scores on a score sheet which system comprises a frame, a carriage, a print head mounted on said carriage, means mounting said carriage on said frame for movement in a reciprocal path relative to said frame for positioning said print head along said path, stop means for stopping movement of said carriage at one end of said reciprocal movement, spring means urging said carriage against said stop means, tape means attached to said carriage at one end for pulling said carriage against the urging of said spring means, reel means receiving said tape for winding said tape on said reel, means mounting said reel on said frame for rotation, differential gear means for driving said reel in predetermined units of rotation to wind predetermined units of said tape on said reel, said differential gear means having a common unit of input and a plurality of units of output in multiples of said unit of input to thereby provide a plurality of gear output ratios, motor means, clutch means for engaging said motor means with said gear means at separate positions for providing each of said outputs and additive combinations thereof, selection means for selecting said outputs and additive combinations thereof, and control means for actuating proper ones of said clutch means responsive to said selection means to provide the selected gear output ratio, resulting in movement of said carriage a predetermined distance for positioning said print head.

5. A printing system for printing bowling scores on a score sheet which system comprises a frame, a carriage, a print head mounted on said carriage, means mounting said carriage on said frame for movement in two reciprocal paths relative to said frame for positioning said print head along two axes, spring means urging said carriage in one direction along each of said paths, first tape means attached to said carriage for moving said carriage along a first of said paths against the urging of said spring means, pulley means on said carriage, second tape means attached to said frame and extending around said pulley means for moving said carriage along the second of said paths against the urging of said spring means, first and second reel means mounted for rotation on said frame and receiving said first and second tapes respectively, independently operable differential gear means for driving said first and second reels respectively in predetermined units of rotation resulting in movement of said first and second tapes respectively in predetermined units of length, said differential gear means each having a preset unit of input and a plurality of units of output in multiples of said unit of input, motor means, clutch means for engaging said motor means with said gear means at separate positions for providing each of said outputs and additive combinations thereof, selection means for selecting sail outputs and additive combinations thereof, and control means for actuating proper ones of said clutch means responsive to said selection means to provide the selected gear output whereby said carriage is moved in each of two directions a predetermined distance for positioning said print head.

6. A printing system for printing bowling scores on a score sheet which system comprises a frame including a score sheet support surface, a carriage, means mounting said carriage on said frame for movement relative to said support surface, a print head mounted on said carriage, a plurality of type slides, a row of type slugs carried by each of said type slides and mounted for movement relative to said slides toward and away from a hammer impact position, first spring means normally urging said type slugs toward said hammer impact position, means mounting each of said type slides for reciprocal movement to carry a selected slug to a printing station, hammer means mounted in said head for movement to impact type slugs at said print position and drive the slugs away from their impact position into printing engagement with the score sheet, hammer slide means for actuating said hammer, second spring means normally urging each of said type and hammer slides in one direction of their reciprocal movement, a second set of slide means mounted on said frame corresponding in number to the type and hammer slide means in said print head, tape means connecting each of said type and hammer slide means with one of said second slide means for movement of said tape and hammer slide means by said second slide means independent of movement of said carriage in either direction, means for moving said second slide means against said second spring means for adjusting each of said type slide means to present a selected type slug at said printing station and for moving said hammer slide means for driving said hammer into printing impact with type slugs at said printing station, means for selecting a type slug in each row, and control means for directing said moving means to move selected slugs to the print position.

7. A printing system for printing bowling scores on a score sheet which system comprises a frame, a carriage, means mounting said carriage on said frame for reciprocal movement in two reciprocal paths relative to said frame, a print head mounted on said carriage, a plurality of type slides, a row of type slugs carried by each of said type slides, means mounting each of said type slides for reciprocal movement to carry a selected one of said slugs to and from a print position, hammer means mounted in said head for impacting type slugs at said print position, hammer slide means for actuating said hammer means, a second set of slide means mounted on said frame corresponding in number to the type and hammer slide means in said print head, first tape means connecting each of said type and hammer slide means with one of said second slide means, means for moving said second slide means for adjusting each of said type slide means to present a selected type slug at said print position and for moving the hammer slide means for impacting the type slugs at said print position, spring means urging said carriage normally in one direction along each path, second and third tape means attached to said carriage pulling said carriage against the urging of said spring means along first and second ones of said paths, first and second reel means receiving said second and third tapes respectively for winding on said reels, means mounting said reels on said frame for rotation, separate differential gear means for driving said first and second reels respectively in predetermined units of rotation to wind predetermined units of said first and second tapes respectively on said reels.

8. A printing system for printing bowling score information during a game of bowling in which each bowler on two teams bowls a plurality of balls, a printing head, a score sheet having a plurality of bowler lines in each of two team score areas for accommodating individual bowler scores for two teams of bowlers, means mounting said printing head and score sheet for relative movement between bowler lines of both team areas, means for moving the printing head to a predetermined one of the bowler lines in a predetermined team area, a plurality of arrays of type members each including a plurality of type members, means mounting each array of type members in said head for individual movement to move a selected one of the type members of the array to a printing station adjacent the score sheet, means for actuating type at said station for printing on the score sheet, means for holding type at said station during actuation by said actuating means, means for moving each of said arrays, means for driving each of said moving means, means for storing predetermined score information, and means for controlling movement of each of said arrays by said moving means for positioning proper type at said station to print stored information whereby subsequent actuation by said actuating means prints indicia of the held type on said score sheet corresponding to stored information.

9. A printing system for printing bowling score information on a score sheet comprising a printing head, means mounting said printing head for movement relative to the score sheet, a plurality of arrays of type members each including a plurality of type members, means mounting each array of type members in said head for individual movement to move a selected one of the type members of the array to a printing station adjacent the score sheet, means mounting each type member in each array for independent movement into printing engagement with the score sheet, hammer means for driving type at said station into engagement with the score sheet for printing on the score sheet, means for holding type at said station during actuation by said actuating means, means for moving each of said arrays, common means for driving said printing head and actuting means and moving means, means for storing predetermined score information, and means for controlling movement of each of said arrays by said moving means for positioning proper type at said station to print stored information whereby subsequent actuation by said actuating means prints indicia of the held type on said score sheet corresponding to stored information.

10. A printing system for printing bowling score information on a score sheet comprising a printing head, a plurality of linear arrays of type members each including a plurality of type members, means mounting each array of type members in said head for individual sliding movement to move a selected one of the type members of the array to a printing station adjacent the score sheet, means for actuating type at said station for printing on the score sheet, means for holding type at said station during actuation by said actuating means, separate flexible cable means for moving each of said arrays, means for driving each of said cable means, means for storing predetermined score information, and means for controlling movement of each of said arrays by said moving means for positioning proper type at said station to print stored information whereby subsequent actuation by said actuating means prints indicia of the held type on said score sheet corresponding to stored information.

11. The printing system of claim 10 including second cable means for moving the actuating means.

12. The printing system of claim 11 wherein said driving means is a common drive adapted to also drive said second cable means.

13. The printing system of claim 11 including means mounting said head for movement along X and Y axes relative to the score sheet, and third cable means for moving the head along said axes.

14. The printing system of claim 13 wherein said driving means is a common drive adapted to also drive said second and third cable means.

15. A printing system for printing bowling score information on a score sheet having a plurality of bowler lines and score entry columns, which system comprises a printing head, means mounting said printing head for driven movement along an X axis between columns and for movement along a Y axis between bowler lines on the score sheet, a plurality of arrays of type members each including a plurality of type members, means mounting each array of type members in said head for individual movement to move a selected one of the type members of the array to a printing station adjacent the score sheet, means for actuating type at said station for printing on the score sheet, means for holding type at said station during actuation by said actuating means, means for moving each of said arrays, means for driving each of said moving means, means for storing predetermined score information, and means for controlling movement of each of said arrays by said moving means for positioning proper type at said station to print stored information whereby subsequent actuation by said actuating means prints indicia of the held type on said score sheet corresponding to stored information.

16. The printing system of claim 15 wherein said means for storing predetermined score information is a first storage means having an electrical score information output signal, and including second storage means for storing predetermined game frame information in the form of X-axis printer position information and having an electrical X-axis position output signal, third storage means for storing preselected bowler identification information in the form of Y-axis printer position and having an electrical Y-axis position output signal, carriage means carrying said printing head and mounted for movement along X and Y axes, electro-mechanical means for moving said carriage simultaneously along X and Y axes responsive to electrical signal outputs and said second and third storage means and wherein said movement controlling means includes electro-mechanical means for comparing the electrical output signal from said first storage means with the type position and setting the type to correspond to stored information in said first storage means.

17. The printing system of claim 15 including means for driving said printing head simultaneously along both X and Y axes.

18. The printing system of claim 15 including binary means for moving said print head.

19. The device of claim 18 including means mounting said printing head for movement relative to the score sheet along X and Y axes for printing at selected positions on the score sheet, said actuating means comprising a hammer movable to strike the type at said station for printing and including a common drive and means driven by said common drive and extending to said printing head for moving said head along said axes including said array driving means for moving said type to said station and including means moving said hammer to strike said type at said station.

20. The device of claim 18 including means mounting said printing head for movement along both X and Y axes relative to the score sheet to a printing position for printing on the score sheet, first tape means attached to and extending from said type means to said driving means for moving the type slugs through the printing station, and second tape means attached to said head for moving said head a selected number of units relative to the score sheet, selector means for selecting the number of units of head movement desired, and control means for actuating the drive means for moving said head selected number of units.

21. The printing system of claim 18 wherein said printing head mounting means comprises means mounting said printing head for movement relative to the score sheet along X and Y axes and wherein said binary means comprises binary digital displacement means for moving said printing head along said axes.

22. The printing system of claim 18 wherein said printing head mounting means comprises means mounting said printing head for movement along both X and Y axes and said printing head moving means comprises means for simultaneously driving said printing head for compound simultaneous movement along both axes.

23. The printing system of claim 22 wherein said printing head moving means comprises tape means extending from said printing head to said driving means.

24. The printing system of claim 23 including selector means for selecting the desired units of movement along said axes, and control means for controlling the driving means to drive the separate tape means for simultaneous movement of the printing head along X and Y axes a distance corresponding to the selected units of movement.

25. The printing system of claim 24 including selector means for selecting the number of units of head movement desired along X and Y axes, and control means for actuating the driving means for moving the head the selected number of units.

26. The system of claim 25 wherein said head positioning means includes means normally biasing said head in one direction of movement and said drive means comprises means releasing a length of said tape means corresponding to the selected units of head movement whereby said resilient means urges said head said selected number of units and for moving said tape against the urging of said resilient means whereby said head is moved in the opposite direction.

27. The printing system of claim 25 wherein said drive means comprises differential gear means having a plurality of gear ratio outputs, motor means, and one revolution clutch means for engaging said motor means with said gear means for providing each of said outputs and additive combinations thereof, and wherein said control means comprises means for actuating proper ones of said clutch means to provide the output gear ratio corresponding to the selected number of units of head movement desired.

28. The system of claim 27 wherein said gear ratio outputs include 1:1, 2:1, 4:1 and 8:1.

29. The system of claim 28 wherein said gear ratio outputs include 1/2:1.

References Cited by the Examiner

UNITED STATES PATENTS

| | | | |
|---|---|---|---|
| 2,505,729 | 4/1950 | Zenner | 101—109 X |
| 2,757,775 | 8/1956 | Hickerson | 197—49 |
| 2,862,389 | 12/1958 | Potter | 101—109 X |
| 3,042,174 | 3/1962 | Howard | 197—49 X |
| 3,063,540 | 11/1962 | Howard | 197—49 |
| 3,101,233 | 8/1963 | McNaney | 101—93 X |
| 3,111,085 | 11/1963 | Hayek | 101—109 X |
| 3,124,355 | 3/1964 | Mentzer et al. | 101—93 X |
| 3,158,090 | 11/1964 | Wasserman | 101—93 |
| 3,199,446 | 8/1965 | Schaaf | 101—93 |
| 3,215,245 | 11/1965 | Thiene et al. | 197—2 |

ROBERT E. PULFREY, *Primary Examiner.*

E. S. BURR, *Assistant Examiner.*